(12) United States Patent
Kamite

(10) Patent No.: US 8,007,881 B2
(45) Date of Patent: Aug. 30, 2011

(54) WOOD-LIKE MOLDED PRODUCT, MANUFACTURING APPARATUS FOR THE SAME, AND MANUFACTURING METHOD OF THE SAME

(75) Inventor: Masayuki Kamite, Suginami-ku (JP)

(73) Assignee: Misawa Homes Co., Ltd., Tokyo (JP)

( * ) Notice: Subject to any disclaimer, the term of this patent is extended or adjusted under 35 U.S.C. 154(b) by 21 days.

(21) Appl. No.: 11/481,790

(22) Filed: Jul. 7, 2006

(65) Prior Publication Data
US 2006/0251834 A1 Nov. 9, 2006

Related U.S. Application Data

(62) Division of application No. 10/520,625, filed as application No. PCT/JP02/11676 on Nov. 8, 2002, now abandoned.

(30) Foreign Application Priority Data

Jul. 16, 2002 (JP) .................................. 2002-206854
Sep. 10, 2002 (JP) .................................. 2002-264416

(51) Int. Cl.
*B32B 1/02* (2006.01)
*B32B 1/08* (2006.01)
*B32B 23/02* (2006.01)

(52) U.S. Cl. ..................... 428/34.1; 428/34.2; 428/35.7; 428/35.9; 428/36.9

(58) Field of Classification Search ................. 428/34.1, 428/34.2, 35.7, 35.9, 36.9
See application file for complete search history.

(56) References Cited

U.S. PATENT DOCUMENTS

| | | | |
|---|---|---|---|
| 2,517,799 A * | 8/1950 | McWhorter et al. | 264/109 |
| 4,122,147 A * | 10/1978 | Vrcelj | 264/255 |
| 5,068,070 A * | 11/1991 | Gunji et al. | 264/41 |
| 5,223,311 A * | 6/1993 | Tsutsumi et al. | 427/388.1 |
| 5,578,098 A * | 11/1996 | Gagliardi et al. | 51/295 |
| 5,700,555 A * | 12/1997 | Grill | 422/286 |
| 5,759,647 A * | 6/1998 | Kuroda et al. | 428/34.5 |
| 5,847,016 A * | 12/1998 | Cope | 521/84.1 |
| 5,869,588 A * | 2/1999 | Toan et al. | 526/261 |
| 6,228,301 B1 | 5/2001 | Taguchi et al. | 264/140 |
| 6,716,522 B2 * | 4/2004 | Matsumoto et al. | 428/326 |
| 7,098,292 B2 * | 8/2006 | Zhao et al. | 528/272 |
| 2002/0161072 A1 * | 10/2002 | Jacoby et al. | 524/27 |
| 2003/0021915 A1 * | 1/2003 | Rohatgi et al. | 428/15 |

FOREIGN PATENT DOCUMENTS

| | | |
|---|---|---|
| JP | 60/8035 | 1/1985 |
| JP | 63/140270 | 9/1988 |
| JP | 06-255294 | 9/1994 |
| JP | 08-207111 | 8/1996 |
| JP | 8-281772 | 10/1996 |

(Continued)

*Primary Examiner* — Marc A Patterson
(74) *Attorney, Agent, or Firm* — Oblon, Spivak, McClelland, Maier & Neustadt, L.L.P.

(57) ABSTRACT

A wood-like molded product which is permitted to have wood-like features without using a natural wood material, and is usable as a bottle case to keep a wine bottle or the like inserted therein, and the like. The wood-like molded product includes: a cylindrical main body which is made of a mixed material containing: fine cellulose powder particles obtained from a wood material; and resin, and permits a bottle to be inserted thereinto; and a supporting member provided in the cylindrical main body, to support a bottom face of the bottle inserted in the cylindrical main body.

12 Claims, 24 Drawing Sheets

FOREIGN PATENT DOCUMENTS

| | | |
|---|---|---|
| JP | 8-300497 | 11/1996 |
| JP | 09-117951 | 5/1997 |
| JP | 9-140540 | 6/1997 |
| JP | 3071413 | 6/2000 |
| JP | 2001-277324 | 10/2001 |
| JP | 2002-30799 | 1/2002 |

* cited by examiner

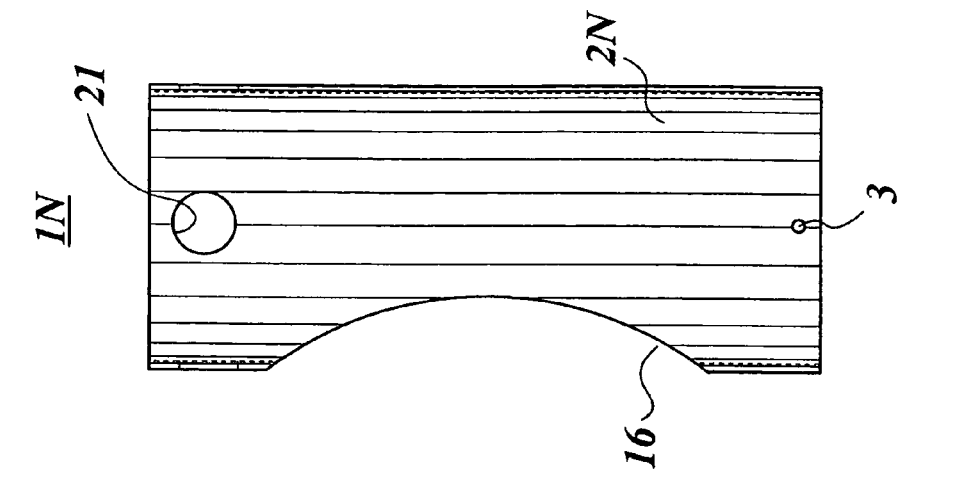
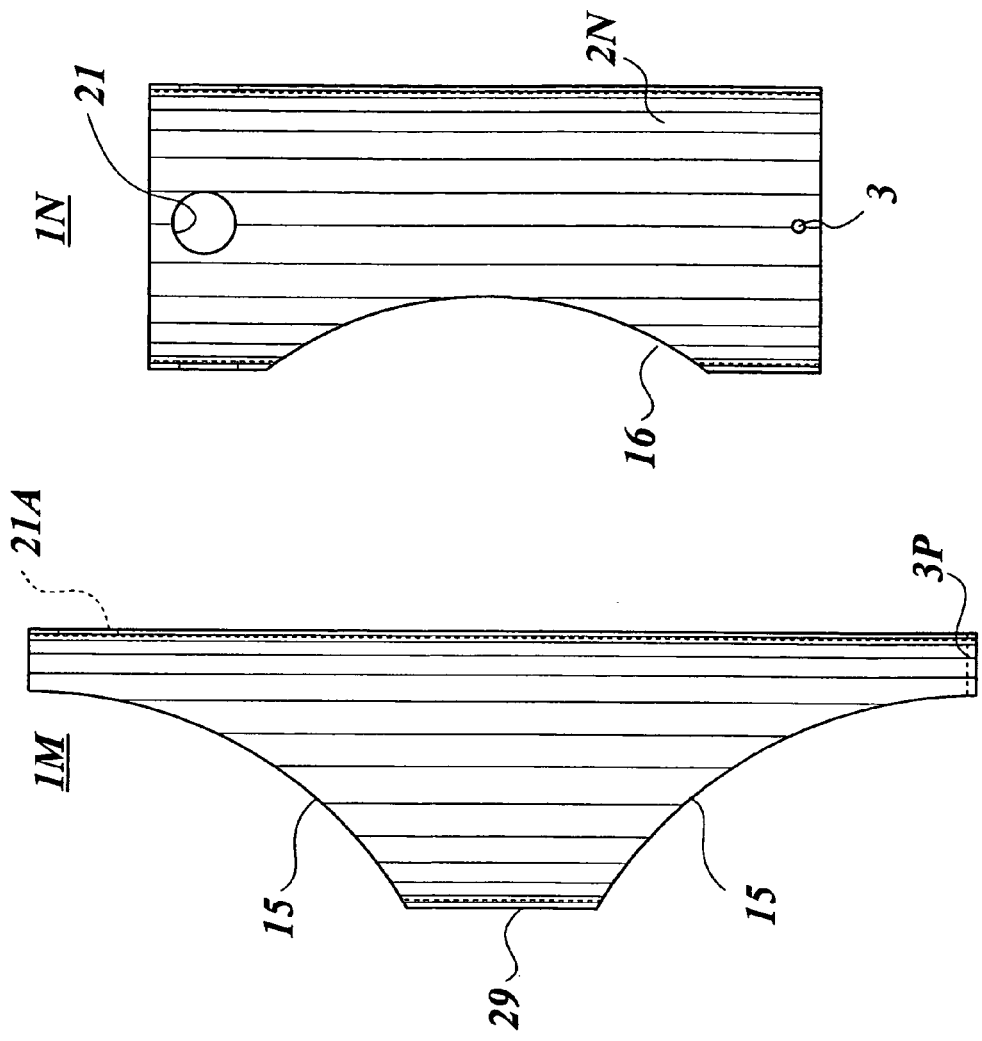
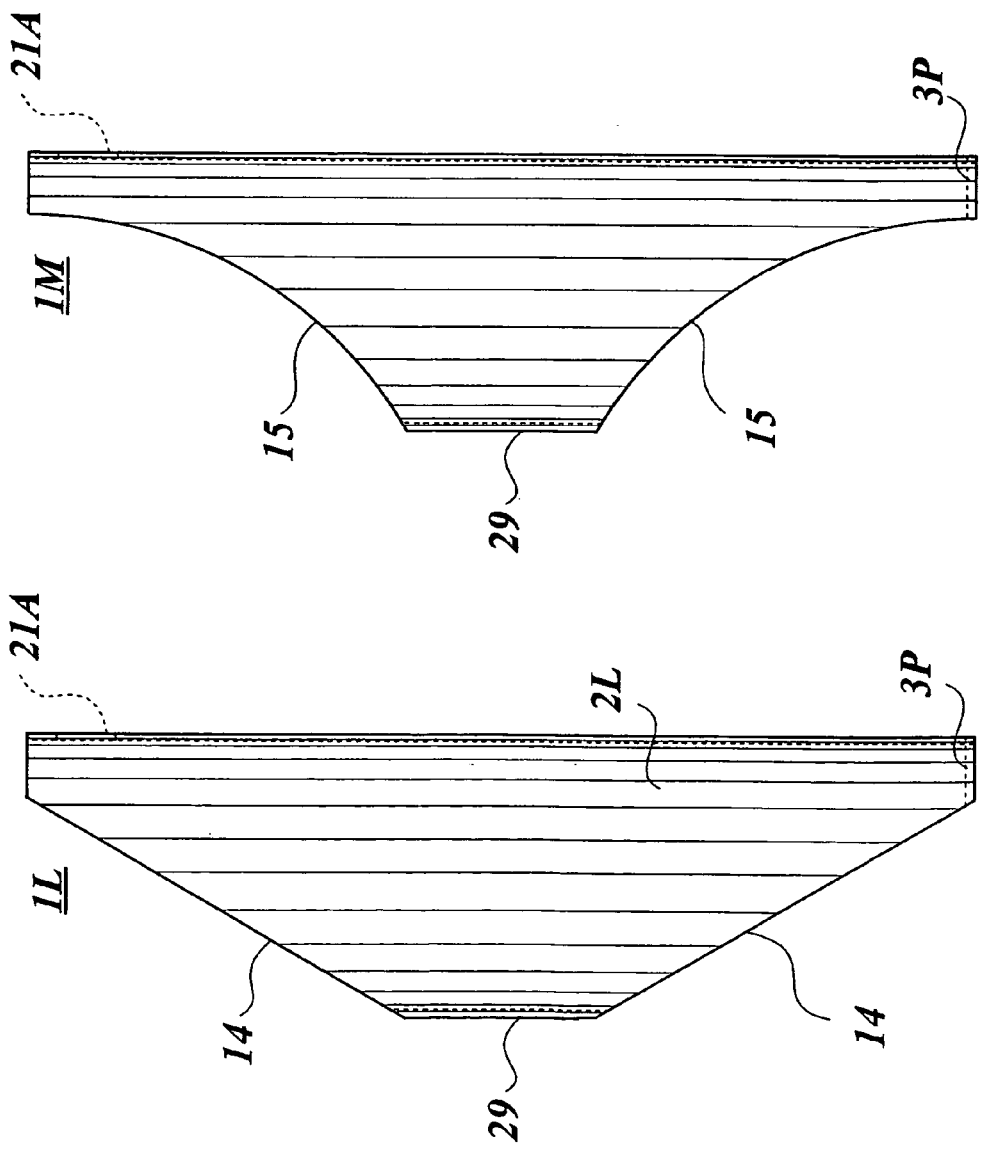

*1U*

*1U*

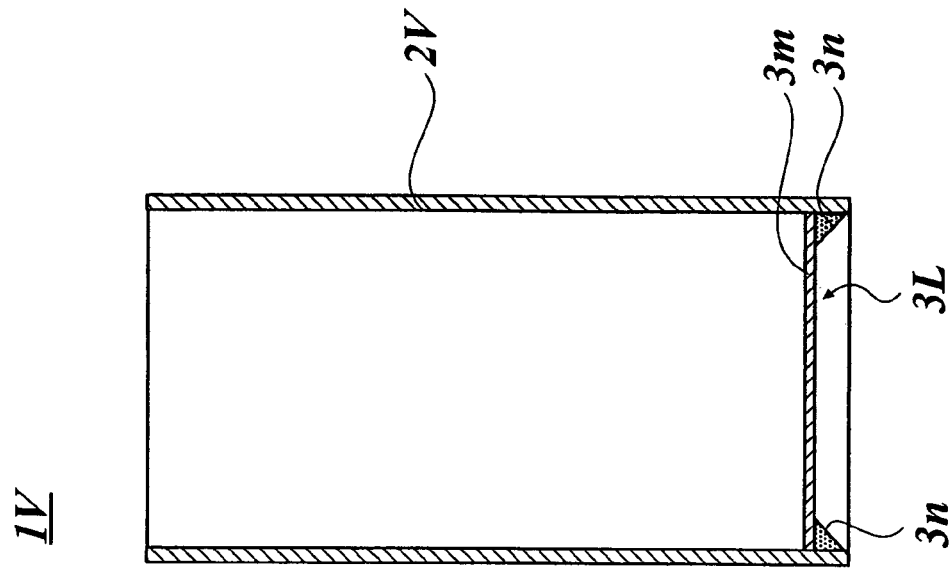
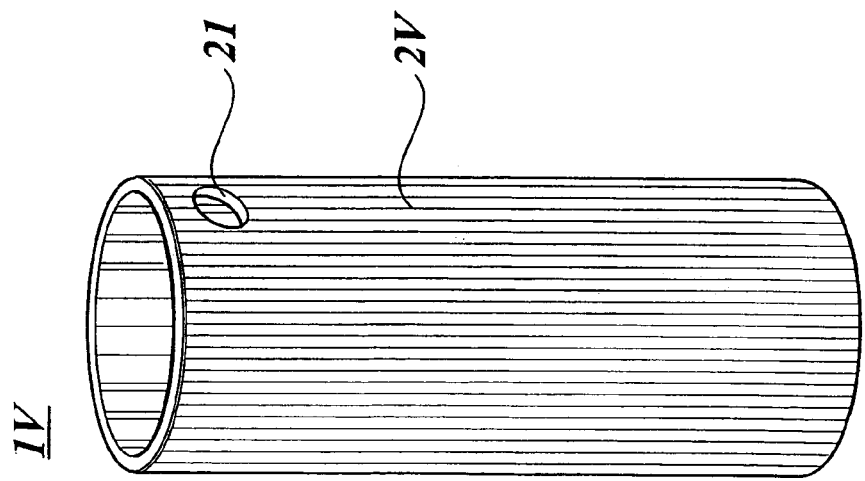

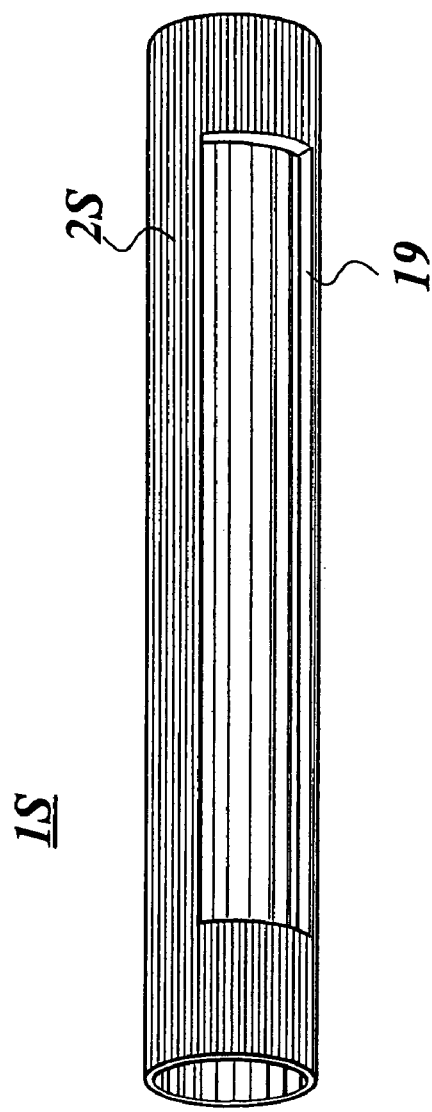
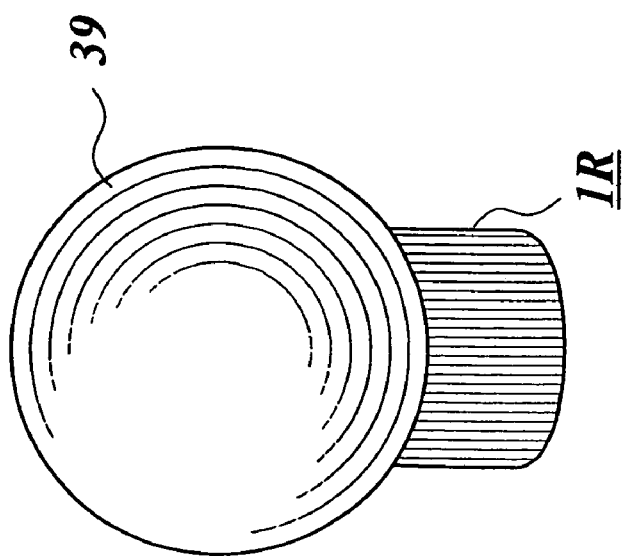
FIG. 24B
FIG. 24A

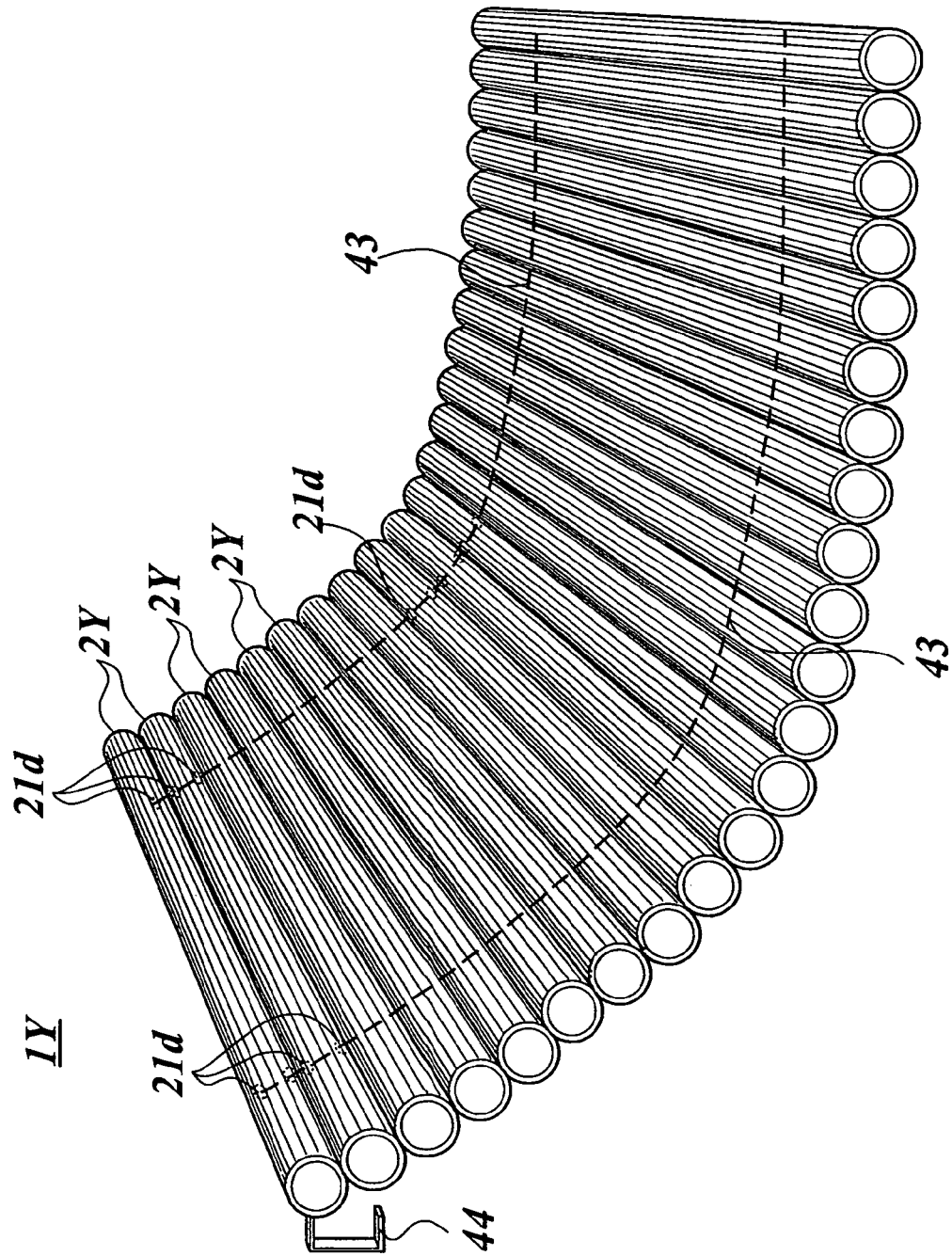

WOOD-LIKE MOLDED PRODUCT, MANUFACTURING APPARATUS FOR THE SAME, AND MANUFACTURING METHOD OF THE SAME

This application is a Division of and claims the benefit of priority under 35 U.S.C. §120 from U.S. Ser. No. 10/520,625, filed on Jan. 10, 2005, which is a national stage of international filing PCT/JP02/11676 filed Nov. 8, 2002. This application also claims the benefit of priority under 35 U.S.C. §119 from Japanese Patent Application No. 2002-206854 and 2002-264416, filed Jul. 16, 2002 and Sep. 10, 2002 respectively, the entire contents of each which are incorporated herein by reference.

TECHNICAL FIELD

The present invention relates to a wood-like molded product, a manufacturing apparatus for the same and a manufacturing method of the same.

BACKGROUND ART

Wines are used as a present for many occasions, and, at home, in restaurants and the like, wines are kept and used as a decoration for the room, by using a wine bottle holder which is made up of linear members, and holds a wine bottle in an inclined state (for example, see Patent Document 1).

Further, wines are kept and used as a decoration for the room, by using, for example, a bottle holder made up of wires to hold two bottles in a state where one is supported on the left side and another on the right side thereof, such that the bottles form an opening which is open upper end (for example, see Patent Document 2).

Furthermore, at home, in restaurants and the like, when wine bottles are kept and used as a decoration, wine bottles are sometimes kept and displayed in a wooden case, a wooden case has more relaxing features than linear members such as wires.

Patent Document 1: JP-Jitsukaihei-7-20148A
Patent Document 2: JP-Tokukaihei-11-313746A Meanwhile, in recent years, depletion of natural resources due to cutting of a large quantity of trees has been a problem, and there is a possibility that a stable supply of wood materials becomes difficult. Therefore, it is desirable that the above-mentioned bottle case is manufactured using a material other than wood.

Thus, the present applicant has tried to produce the bottle case by using the technique for molding a color pellet into a cylindrical shaft of writing utensils through extrusion molding or injection molding, which is disclosed in JP-Tokukaihei-6-255294A that is a gazette of an application filed by the applicant, in which fine cellulose powder particles, on which polish-grinding processing have been performed and white inorganic pigment is carried, and vinyl chloride resin of which the polymerization degree is approximately 1000 are mixed and hardened to prepare the color pellet.

In the technique disclosed in the above gazette, chips and sawdust of building wood members are used as the material for the fine cellulose powder particles. However, in view of effective use of resources and environmental protection, the present applicant has tried to produce a wood-like molded product used as the bottle case and the like, by using a material obtained from the technique disclosed in JP-Tokukaihei-11-129223A. Here, building members once used are collected, collected wood members which are wood-like members in the building members are used as a material for the fine cellulose powder particles, and collected resin members which are resin-based members in the collected building members are used as the above-mentioned vinyl chloride resin. The collected wood and resin members are crushed, and recycled to be used as a raw material.

Since the collected wood and resin members have been used as building members or resin products, plaster, a heat insulating material, calcium carbonate, talc, pigment and the like are added to the collected wood and resin members in accordance with the functions required of the building members and the resin products. Meanwhile, to obtain a wood-like molded product through, for example, extrusion molding, molding is performed by extruding a mixed material obtained by mixing and melting wood flour and resin powder. However, when impurities such as the plaster, heat insulating material, calcium carbonate, talc and pigment make up more than a certain percentage of the mixed material, it is difficult to perform extrusion molding and maintain the external appearance. However, it is desirable to perform extrusion molding with the impurities contained therein, in view of effective use of resources and environmental protection.

The present applicant has discovered that, when the concentration of the impurities is set to 20 wt % or less, molding such as extrusion molding can be performed easily, and the wood-like external appearance can be maintained. Moreover, when the concentration of the wood portion is set to 51 to 55 wt %, sufficient wood-like features can be obtained, and moldability is good. Furthermore, when the concentration of the resin portion is set to 25 to 45 wt %, sufficient strength and rigidity can be obtained, and moldability is good.

An object of the present invention is to provide a product having wood-like features, to be used as a bottle case or the like for keeping a bottle such as a wine bottle contained therein, without using natural wood. In addition, an object thereof is to provide a product used as a bottle case or the like, which is advantageous in view of effective use of resources and environmental protection. Further, an object thereof is to manufacture the product smoothly.

DISCLOSURE OF THE INVENTION

In order to attain the above objects, according to a first aspect of the present invention, a wood-like molded product comprises: a cylindrical main body which is made of a mixed material containing: fine cellulose powder particles obtained from a wood material; and resin, and permits a bottle to be inserted thereinto; and a supporting member provided in the cylindrical main body, to support a bottom face of the bottle inserted in the cylindrical main body.

The wood-like molded product according to the first aspect of the present invention includes: the cylindrical main body made of a mixed material containing fine cellulose powder particles, which are obtained from wood materials, and resin; and the supporting member to support the bottom face of a bottle inserted in the cylindrical main body. Therefore, when chips or sawdust of a building wood material generated at a construction site are used for the wood material for the bottle case, it is possible to avoid cutting natural trees and re-use the resources, as well as to permit the bottle case to have features such as a feel similar to natural wood, that is, wood-like features, and keep a bottle such as a wine bottle inserted in the case. Moreover, since a wine bottle is inserted and kept in the cylindrical main body having wood-like features, the wine kept in the cylindrical main body looks like a more expensive wine than the actual price, due to the wood-like appearance of the cylindrical main body. For example, the wine may look like a wine which costs 5000 to 10000 yen, even when the actual cost of the wine may be 1000 to 3000 yen.

Here, the fine cellulose powder particles obtained by crushing and grinding the wood material may be obtained by performing polish-grinding processing on a raw material, for example, a rough-grained material of various plant cell bodies in such as rough-grained material of wood, rough-grained material of bagasse, or rough-grained material of straw. Polish-grinding processing includes grinding processing and polishing processing, and may be processing of performing the grinding and polishing processing at the same time, and processing including two steps of the grinding processing and the polishing processing after the grinding processing. In other words, the polish-grinding processing here is, as described later, processing including the grinding processing of grinding a rough-grained material into a fine ground material, and the polishing processing of performing surface polishing on the powder particles of the fine ground material, so that the powder particles having inter-tangled fibrous fine hairs on the surface thereof are allowed to have less fine hairs.

The resin here is rigid resin or soft resin including even the resin once manufactured. For the resin, there may be used vinyl chloride resin, foamed vinyl chloride resin, polyethylene resin, polypropylene resin, phenol resin, urethane resin, polyurethane resin, ABS resin, polystyrene resin, and the like. In particular, polyvinyl chloride resin, polyethylene resin and polypropylene resin are suitable. The resin once manufactured includes: a molded product once functioned as cases or packages, consumer electronics products, interior or exterior finishing components for cars, various film sheets, and the like; and chips generated upon molding or processing.

Moreover, pigment may be added upon mixing and melting the fine cellulose ground powder obtained by grinding a wood material and resin. The pigment added appears as a wood grain pattern on the surface of a molded product having wood-like features, thus forming on the surface a wood grain pattern extremely similar to a natural wood grain pattern. In this case, the pigment includes inorganic pigment of three colors, namely, yellow, red and black, such as cadmium yellow, iron oxide and carbon black, and selected as appropriate in accordance with the color of the material itself used to prepare the product as well as the color of the wood grain pattern. Further, when the diameter of the fine cellulose ground powder particle is 1 to 300 μm, the cylindrical main body is resistant to water and corrosion as in the case of conventional wood flour which does not adsorb water (including moisture), solvent, and the like. Examples of the molding method are, in particular, injection molding and extrusion molding.

According to a second aspect of the present invention, for example, as shown in FIGS. 1 to 3, a wood-like molded product comprises: a cylindrical main body 2 which is made of a mixed material prepared by mixing wood waste material ground powder J obtained from a wood waste material containing an impurity and resin waste material ground powder K obtained from a resin waste material containing an impurity, and permits a bottle M to be inserted thereinto; and a supporting member (for example, stick-shaped member 3) provided in the cylindrical main body 2, to support a bottom face Ma of the bottle M inserted in the cylindrical main body 2.

Examples of the wood waste material are a wood waste material obtained upon dismantling of a building such as a house, a wood waste material obtained upon disassembling of furniture, chips of wood materials obtained upon construction of a building, and sawdust. In these wood waste materials, other than the wood portion, impurities such as plaster, heat insulating materials and resin members are contained.

Examples of the resin waste material are resin products used for cases or packaging for drink and food, other resin products, a resin waste material obtained upon dismantling of a building such as a house, a resin waste material obtained upon disassembling of furniture, and the like. These resin waste materials contain not only the resin portion but also impurities such as calcium carbonate for preventing expansion and contraction of resin due to temperature change, talc (for example, talc obtained by finely grinding and baking hydrous magnesium silicate) used as a reinforcement member or a filling member, pigment, and fiber reinforced plastic (FRP).

Examples of the resin constituting the resin portion include polypropylene resin (PP), rigid or soft polyvinyl chloride resin (PVC), foamed vinyl chloride resin, polyethylene terephthalate resin (PET), polystyrene resin (PC), polyethylene resin, phenol resin, urethane resin, ABS resin, and the like.

According to the second aspect of the invention, the wood-like molded product comprises: a cylindrical main body 2 which is made of a mixed material prepared by mixing wood waste material ground powder J obtained from a wood waste material containing an impurity and resin waste material ground powder K obtained from a resin waste material containing an impurity, and permits a bottle M to be inserted thereinto; and a supporting member provided in the cylindrical main body 2, to support a bottom face Ma of the bottle M inserted in the cylindrical main body 2. Accordingly, the wood-like molded product is advantageous in view of effective use of resources and environmental protection, since the wood waste material and the resin waste material are used, without cutting natural trees. Moreover, it is possible to contain and keep a bottle such as a wine bottle in the wood-like molded product having features such as a feel similar to natural wood, in other words, relaxing wood-like features.

As shown in FIG. 12, for example, in the wood-like molded product (for example, bottle case 1F) according to the second aspect of the invention, an opening portion 11 which communicates with the inside of the cylindrical main body 2F and through which the bottle inserted in the cylindrical main body 2F is visually recognizable may be formed.

Thus, since an opening portion 11 through which the bottle inserted in the cylindrical main body 2F is visually recognizable is formed, when a bottle such as a wine bottle is inserted therein, the bottle inserted in the cylindrical main body 2F is visually recognizable through the opening portion 11, while there are advantages in view of effective use of resources and environmental protection because there is no need to cut natural trees. Moreover, it is possible to contain and keep the bottle in the wood-like molded product having features such as a feel similar to natural wood, in other words, relaxing wood-like features.

In particular, in case of wine bottles and the like having a label to show the brand and the like in a central portion thereof, with the opening portion 11 formed in a portion corresponding to the central portion of the wine bottle contained in the cylindrical main body 2F, the label of the bottle can be easily recognized from the outside of the cylindrical main body 2F through the opening portion 11, and thus it is possible to check the brand of the wine kept therein.

According to a third aspect of the present invention, a wood-like molded product comprises: a cylindrical main body which is made of a mixed material prepared by mixing wood waste material ground powder obtained from a wood waste material containing an impurity and resin waste material ground powder obtained from a resin waste material containing an impurity, and permits an article to be inserted thereinto; and a supporting member provided to the cylindrical main body, to support a bottom face of the article inserted in the cylindrical main body. Here, examples of the article include a pen, a brush, scissors, a small article, a fresh flower, a dried flower, and a candle.

According to the third aspect of the invention, the wood-like molded product comprises: a cylindrical main body 2 which is made of a mixed material prepared by mixing wood waste material ground powder J obtained from a wood waste material containing an impurity and resin waste material ground powder K obtained from a resin waste material containing an impurity, and permits an article to be inserted thereinto; and a supporting member 3 provided to the cylindrical main body 2, to support a bottom face of the article inserted in the cylindrical main body 2. Therefore, the wood-like molded product is advantageous in view of effective use of resources and environmental protection, since the wood waste material and the resin waste material are used, without cutting natural trees. Moreover, it is possible to contain and keep articles such as pens, brushes, small articles, fresh flowers, dried flowers and candles in the wood-like molded product having features such as a feel similar to natural wood, in other words, relaxing wood-like features. In addition, since the cylindrical main body has wood-like features, the article contained in the cylindrical main body has an external appearance which looks more expensive than the actual value.

In the wood-like molded product according to the second and third aspects of the invention, for example, as shown in FIG. 3, it is preferable that the cylindrical main body contains a wood portion (for example, wood flour N) in the wood waste material (for example, wood waste material ground powder K), of 51 to 75 wt % with respect to the whole of the cylindrical main body 2, a resin portion P in the resin waste material (for example, resin waste material ground powder K), of 10 to 45 wt % with respect to the whole of the cylindrical main body 2, and the impurities L of 20 wt % or less in total with respect to the whole of the cylindrical main body.

Thus, the cylindrical main body contains a wood portion N in the wood waste material J, of 51 to 75 wt % with respect to the whole of the cylindrical main body 2, a resin portion P in the resin waste material K, of 10 to 45 wt % with respect to the whole of the cylindrical main body 2, and the impurities L of 20 wt % or less in total with respect to the whole of the cylindrical main body 2. The cylindrical main body contains the wood flour N in the wood waste material J, of 51 to 75 wt % with respect to the whole of the cylindrical main body 2, and therefore, the cylindrical main body 2 is permitted to have features such as a feel similar to real wood. Further, the amount of the wood portion used as a component of the mixed material is large, and thus the percentage of re-use of the wood waste material J can be increased. Furthermore, since the cylindrical main body contains the resin portion in the resin waste material K, that is, resin powder P, of 10 to 45 wt % with respect to the whole of the cylindrical main body 2, enough strength and rigidity are obtained from a mold product, and thus moldability upon extrusion molding or the like can be improved. In addition, since the cylindrical main body contains the impurities L of 20 wt % or less in total with respect to the whole of the cylindrical main body 2, moldability upon forming the cylindrical main body by extrusion molding is good. Moreover, since relatively large amount of impurities L are contained, there are advantages in view of effective use of resources and environmental protection, and the cylindrical main body is permitted to have favorable wood-like features. Thus, the product value is increased, and an article such as a bottle contained in the cylindrical main body is permitted to look more expensive than the actual value.

Here, the reason why the concentration of the wood portion N is set to 51 to 75 wt % is that, when the concentration is less than 51 wt %, it is difficult to allow the cylindrical main body to have features such as a feel similar to real wood, and that, when the concentration is more than 75 wt %, moldability of the cylindrical main body upon extrusion molding or the like is decreased due to an excessive concentration of the wood portion. It is possible to keep the wood flour in a molded product when the particle size of the wood flour is set to 1 to 300 μm, the wood flour particles are uniformly dispersed in the cylindrical main body 2, and resin is filled between the wood flour particles. Further, since part of the resin infiltrates into the wood flour particles, it is possible to improve capability to keep the wood flour as well as to prevent moisture from infiltrating into the wood flour.

The reason why the concentration of the resin portion P is set to 10 to 45 wt % is that, when the concentration is less than 10 wt %, the moldability of the cylindrical main body upon extrusion molding or the like is decreased due to a deficient concentration of the resin portion, and that, when the concentration is more than 45 wt %, it is difficult to allow the molded cylindrical main body to have wood-like features due to excessive resin. Here, it is preferable that the concentration of the resin component P is 10 to 30 wt %.

A fourth aspect of the present invention is, for example, as shown in FIG. 1 and FIGS. 6 to 8, a manufacturing apparatus to manufacture the cylindrical main body of the wood-like molded product according to any one of the first to third aspects, through extrusion molding, the apparatus comprising: an extrusion molding device 30 to heat and melt the mixed material 112, and mold the mixed material into a cylindrical shape through extrusion molding; a sizer member 40 which includes an opening portion 41 of which an inner diameter is substantially the same as an outer diameter of an extrusion mold product 115 in the cylindrical shape produced by the extrusion molding device 30 through the extrusion molding, and adjusts a sectional shape and a dimension of the extrusion mold product 115 by inserting the extrusion mold product 115 into the opening portion 41; and a cutting device 117 to cut the extrusion mold product 115, of which the sectional shape and the dimension are adjusted by the sizer member 40, into a predetermined length, thus forming the cylindrical main body 2.

According to the manufacturing apparatus, the cylindrical main body 2 is produced by: heating and melting the mixed material 112 and subjecting the mixed material 112 to extrusion molding with the extrusion molding device 30 to form the cylindrical extrusion mold product 115; inserting the extrusion mold product 115 into the opening portion 41 of the sizer member 40, of which inner diameter is substantially the same as the outer diameter of the extrusion mold product 115, to adjust the sectional shape and the dimensions of the extrusion mold product 115; and then cutting the extrusion mold product 115 with the cutting device 117 into a predetermined length. In this way, it is possible to permit the cylindrical main body 2 of the wood-like molded product (for example, bottle case 1) according to any one of claims 1 to 3 to have wood-like features while there are advantages in view of re-use of resources, and to have a suitable shape and dimensions. Thus, the product value is increased.

A fifth aspect of the present invention is a manufacturing method of manufacturing the cylindrical main body of the wood-like molded product according to any one of the first to third aspects of the invention, for example, as shown in FIGS.

1 and 6, the manufacturing method comprising: an extrusion molding step (for example, molding step F) of heating and melting the mixed material 112, and molding the mixed material into a cylindrical shape through extrusion molding; a sizer step of adjusting a sectional shape and a dimension of an extrusion mold product 115 molded through the extrusion molding in the extrusion molding step F; and a cutting step H of cutting the extrusion mold product 115, of which the sectional shape and the dimension are adjusted in the sizer step, into a predetermined length, thus forming the cylindrical main body 2.

According to the manufacturing method, the cylindrical main body is produced by: heating and melting the mixed material and subjecting the mixed material to extrusion molding to form the mixed material into a cylindrical shape, in the extrusion molding step; adjusting the sectional shape and the dimensions of the extrusion mold product formed by the extrusion molding, in the sizer step; and cutting the extrusion mold product, of which sectional shape and dimensions are adjusted, into a predetermined length, in the cutting step H. In this way, it is possible to permit the cylindrical main body 2 of the wood-like molded product (for example, bottle case 1) according to any one of claims 1 to 5 to have wood-like features while there are advantages in view of re-use of resources, and to have a suitable shape and dimensions.

BRIEF DESCRIPTION OF THE DRAWINGS

FIGS. 2A and 2B are views showing a structure of the bottle case in FIG. 1, in which FIG. 2A is a schematic longitudinal sectional view of the bottle case, and FIG. 2B is a view showing a supporting member of the bottle case, in which a lower end portion of the bottle case is viewed from the bottom of the bottle case;

FIGS. 5A and 5B are views showing modifications of the bottle case of the embodiment to which the present invention is applied, in which FIG. 5A is a view showing an example of a bottle case having a flat face portion on the outer surface of a cylindrical main body of the bottle case, and FIG. 5B is a view showing an example of a bottle case of which a cylindrical main body has a polygonal section;

FIGS. 9A and 9B are views showing a modification of a supporting member of the bottle case of the embodiment to which the present invention is applied, in which FIG. 9A is a schematic longitudinal sectional view of the bottle case including ribs as supporting members, and FIG. 9B is a plan view thereof;

FIGS. 11A and 11B are views showing another modification of the bottle case of the embodiment to which the present invention is applied, in which FIG. 11A is a schematic longitudinal sectional view of the bottle case, and FIG. 11B is a plan view of the bottle case;

FIGS. 14A, 14B and 14C are views showing modifications of the bottle case to which the present invention is applied, in which FIG. 14A is a side view of the bottle case including an opening portion in the cylindrical main body thereof, FIG. 14B is a side view of the bottle case including a cut-out portion formed on the cylindrical main body thereof, and FIG. 14C is a side view of the bottle case including an opening portion and a cut-out portion provided on the cylindrical main body thereof;

FIGS. 15A, 15B and 15C are views showing modifications of the bottle case to which the present invention is applied, in which FIG. 15A is a side view of the bottle case including a cylindrical main body of which top and bottom edge portions are diagonally cut out, FIG. 15B is a side view of the bottle case including a cylindrical main body of which top and bottom edge portions are cut out in a circular arc shape, and FIG. 15C is a side view of the bottle case including a cylindrical main body having a large opening portion in a central portion thereof;

FIGS. 18A, 18B and 18C are views showing a second embodiment of the wood-like molded product according to the present invention, in which FIG. 18A is a perspective view of the wood-like molded product, FIG. 18B is a side view of the wood-like molded product, and FIG. 18C is a schematic longitudinal sectional view of a lower portion of the wood-like molded product;

FIGS. 19A and 19B are views showing a flower vase as a third embodiment of the wood-like molded product according to the present invention, in which FIG. 19A is a side view of the flower vase, and FIG. 19B is a longitudinal sectional view of the flower vase;

FIGS. 20A and 20B are views showing a flower vase as a fourth embodiment of the wood-like molded product according to the present invention, in which FIG. 20A is a perspective view of the flower vase, and FIG. 20B is a longitudinal sectional view of the flower vase;

FIGS. 21A and 21B are views showing a candle holder as a fifth embodiment of the wood-like molded product according to the present invention, in which FIG. 21A is a perspective view of the candle holder, and FIG. 21B is a longitudinal sectional view of the candle holder;

FIGS. 22A and 22B are views showing a candle holder as a sixth embodiment of the wood-like molded product according to the present invention, in which FIG. 22A is a perspective view of the candle holder, and FIG. 22B is a longitudinal sectional view of the candle holder;

FIGS. 23A and 23B are views showing an example of a pseudo tree of an extrusion mold product, in which FIG. 23A is a perspective view of the pseudo tree, and FIG. 23B is an another example of a pseudo tree using the pseudo tree in FIG. 23A;

FIGS. 24A and 24B are views showing an example using an extrusion mold product, in which FIG. 24A is a view showing a socket cover, and FIG. 24B is a view showing a fluorescent light cover;

FIG. 25 is a view showing a belt-shaped member using extrusion mold products to be the cylindrical main bodies;

FIGS. 26A, 26B and 26C are views showing a bottle holder using an extrusion mold product to be the cylindrical main body, in which FIG. 26A is a perspective view of the bottle holder, FIG. 26B is a view showing a circular arc plate member formed by dividing a cylindrical body similar to the cylindrical main body, and FIG. 26C is a view showing a supporting plate member to support the circular arc plate member; and FIGS. 27A and 27B are views showing a produce molded with the manufacturing apparatus, in which FIG. 27A is a pot cover made up of extrusion molded large pipes, and FIG. 27B is a chopstick rest.

BEST MODES FOR CARRYING OUT THE INVENTION

Hereinbelow, embodiments of the present invention will be described in detail with reference to the drawings.

First, the constitution will be described.

Figure 1:
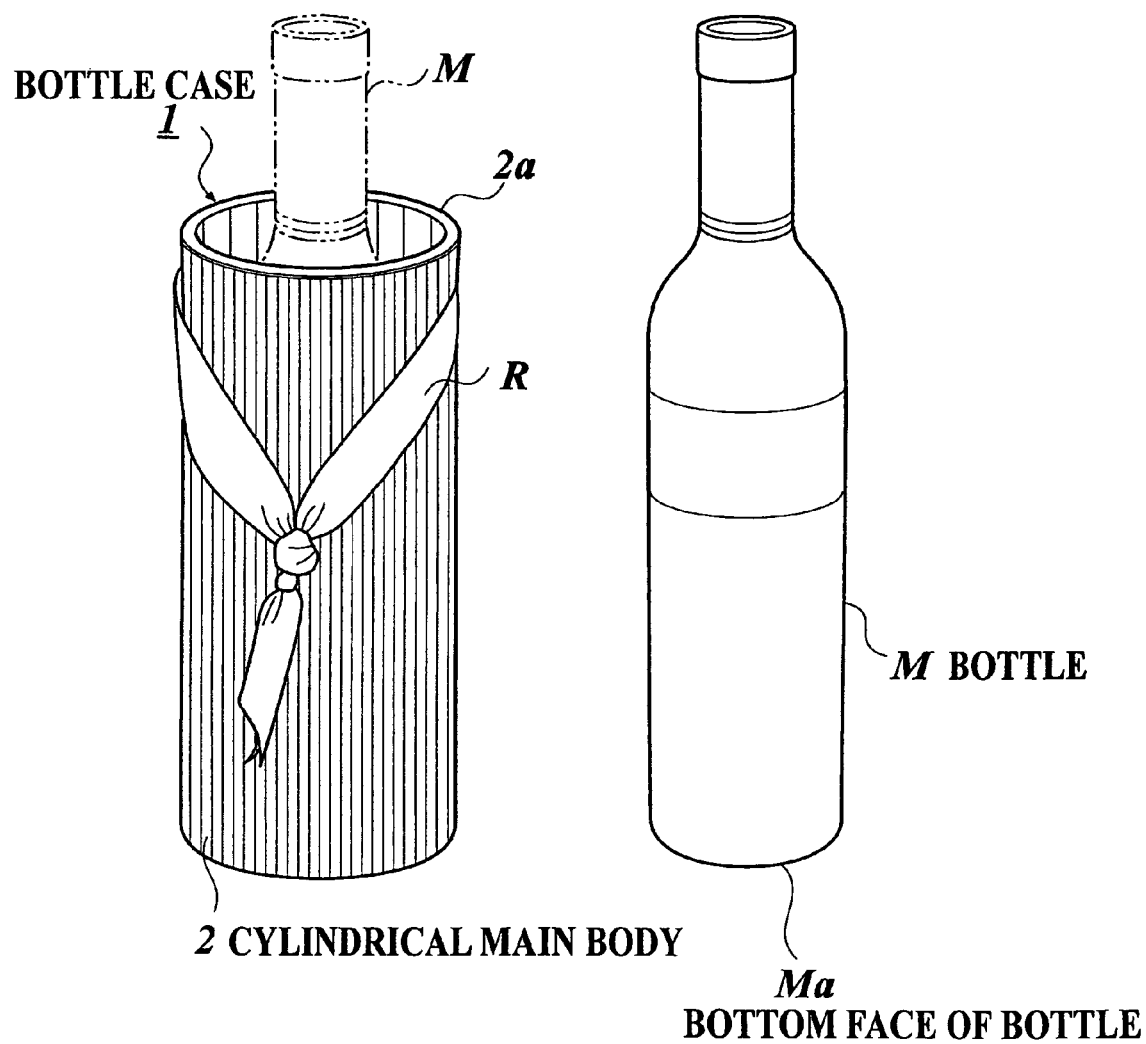
FIG. 1 is a perspective view showing a bottle case of an embodiment to which the present invention is applied, and a wine bottle placed next to the bottle case.
Figure 2A:
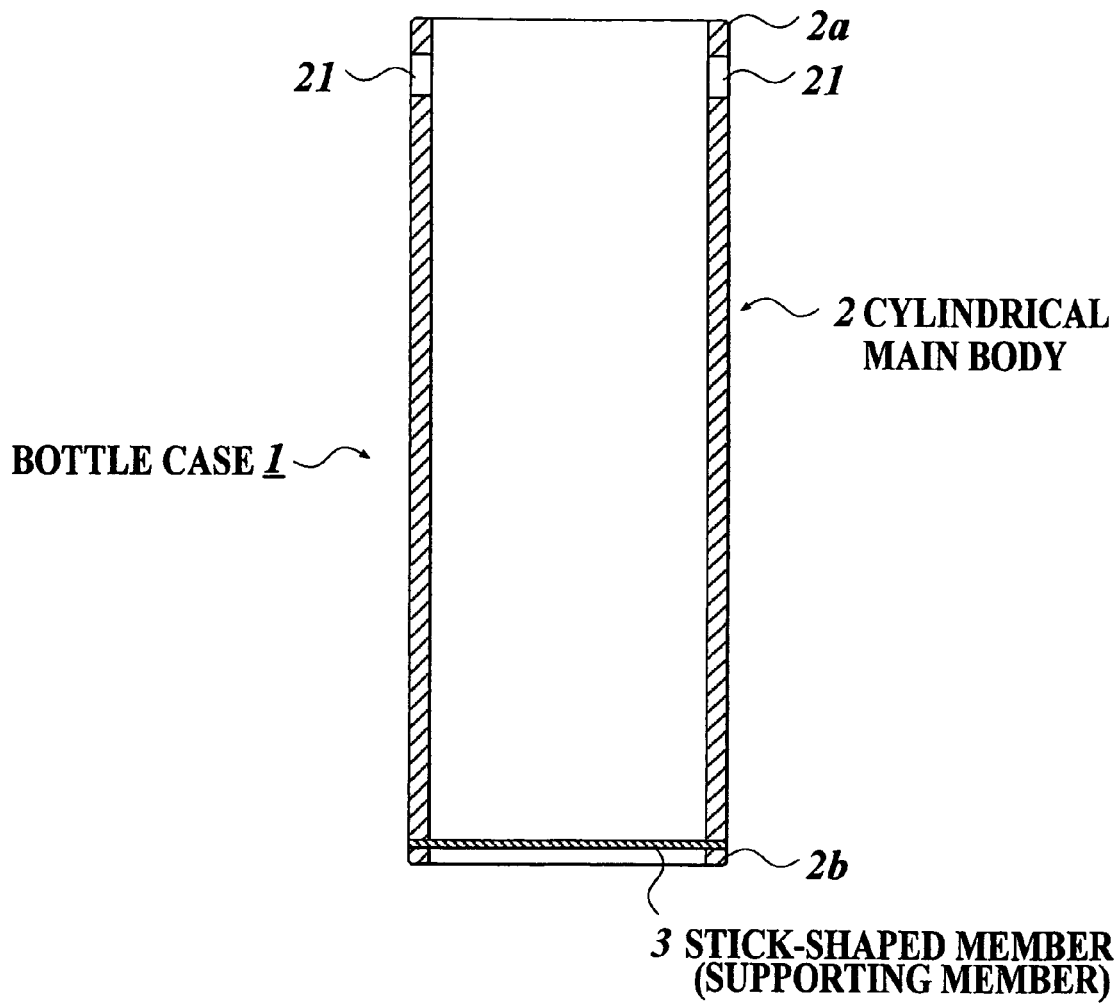
Figure 2B:
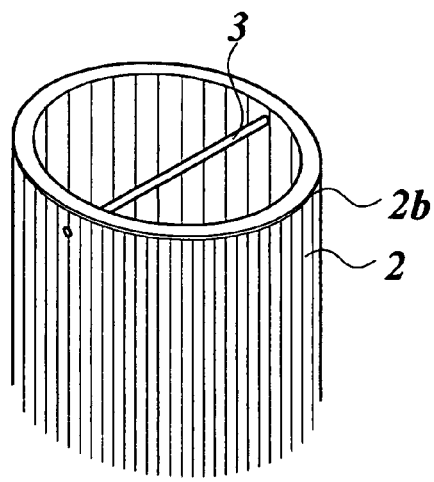
Figure 3:
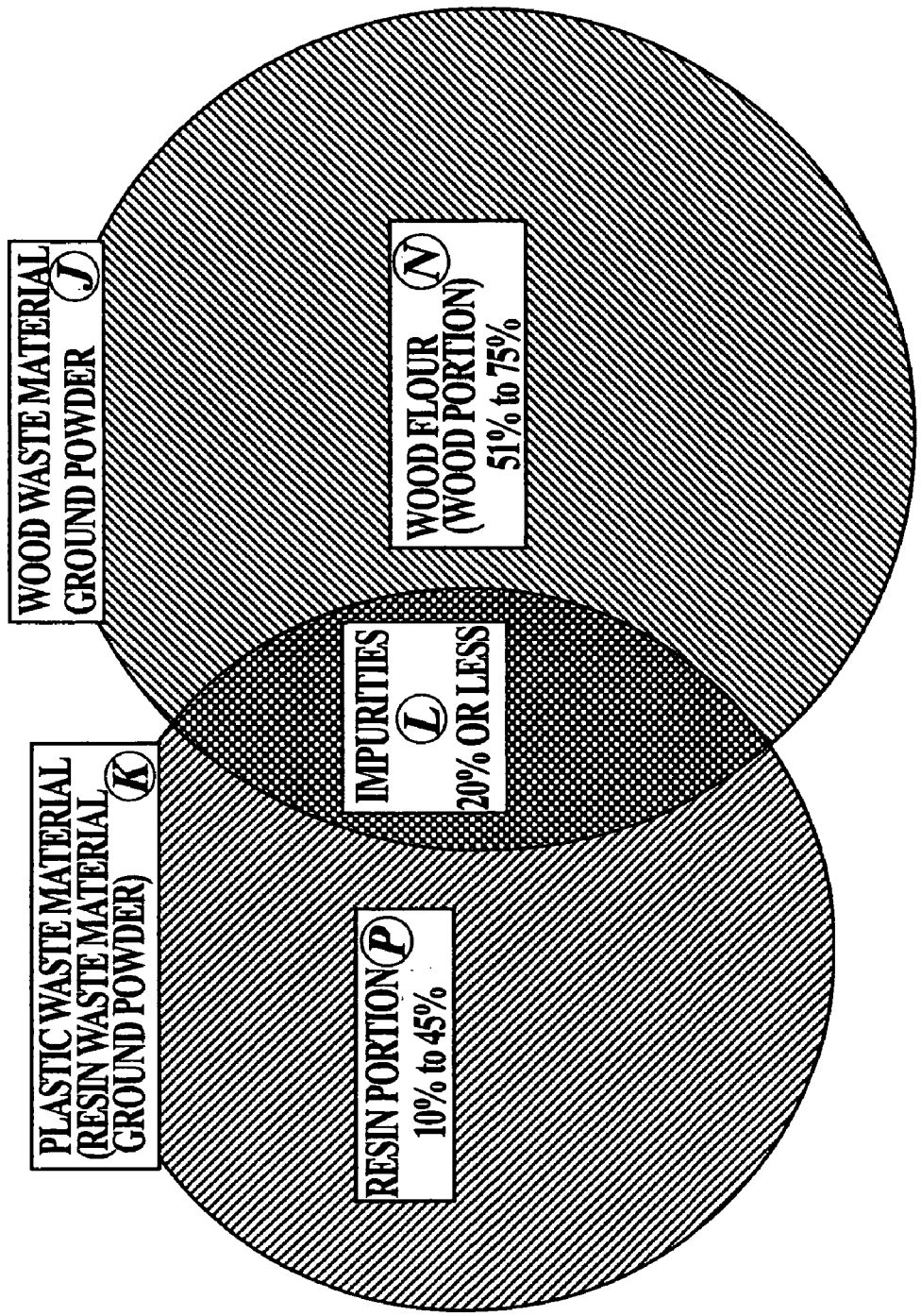
FIG. 3 is a Venn diagram showing an example of a mixing ratio for a cylindrical main body 2 of the bottle case of the embodiment.
Figure 6:
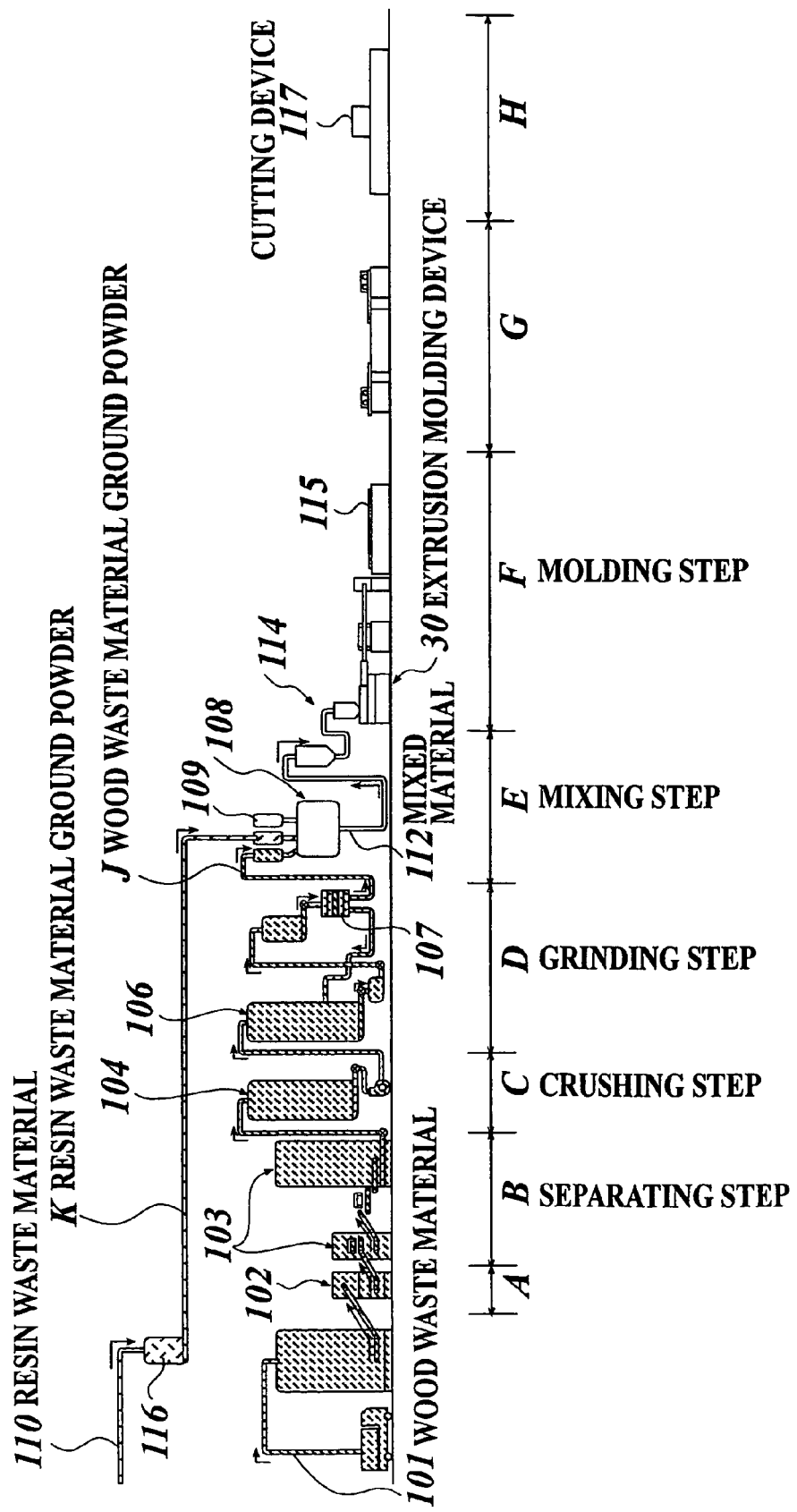
FIG. 6 is a conceptual view showing a manufacturing apparatus for a cylindrical main body of an embodiment to which the present invention is applied.

As shown in FIGS. 1 to 3, a bottle case 1 to which a wood-like molded product is applied is made of a mixed material (denoted by reference numeral 112 in FIG. 6) prepared by mixing wood waste material ground powder J obtained from a wood waste material (denoted by reference numeral 101 in FIG. 6) containing impurities and resin waste material ground powder K obtained from a resin waste material (here, a plastic wasted material: denoted by reference numeral 110 in FIG. 6) containing impurities, the bottle case 1 including a cylindrical main body 2 to permit a bottle M to be inserted inside thereof, and a supporting member 3 provided in the cylindrical main body 2, to support a bottom face Ma of the bottle M inserted in the cylindrical main body 2. The bottle case 1 in this embodiment is used to contain and keep a wine bottle therein and placed in a room, a restaurant and the like for decoration.

The cylindrical main body 2 has features such as a feel similar to natural wood, and formed by subjecting the mixed material to extrusion molding or injection molding (here, formed by extrusion molding). The cylindrical main body 2 has a cylindrical shape with a predetermined length. Here, the predetermined length is a length long enough to almost contain the body portion of the bottle M inserted therein.

Outer peripheral edges 2a and 2b of both end portions of the cylindrical main body 2 are chamfered to remove sharpness.

In a circumferential wall in an upper portion of the cylindrical main body 2, formed are holes 21, 21 which are open in a direction perpendicular to an axial direction of the cylindrical main body 2, at positions opposed to each other.

The inner side of the cylindrical main body 2 is communicated with the outer side thereof through these holes 21, 21, and the line connecting the holes 21, 21 passes through the center of axis of the cylindrical main body 2.

A ribbon R or the like is inserted through the holes 21, 21 and tied in a preferred shape, to permit the cylindrical main body 2 to be decorated.

With respect to the cylindrical main body 2, 51 to 75 wt % of the entire cylindrical main body is wood portion of the wood waste material, 10 to 45 wt % of the entire cylindrical main body is resin portion of the resin waste material, and 20 wt % or less of the entire cylindrical main body is the impurities. Here, the particle size of the wood flour contained in the wood waste material is, for example, 200 μm. The particle size of the wood flour is not limited thereto; the particle size thereof may be any size as long as the particle size is, for example, 1 to 300 μm.

Examples of the impurities contained in the wood waste material include: plaster of plaster boards used as a fireproof material for a wooden building constructed by a panel construction method, a two-by-four method, a traditional wooden construction method or the like; a heat insulating material filled in such as wall panels and floor panels; and the like. Examples of the impurities contained in the plastic waste material include: calcium carbonate; talc; pigment; polyethylene (hereinafter referred to as PE); fiber reinforced plastic (FRP); and the like. Examples of the plastic waste material from which impurities are removed are: polypropylene (hereinafter referred to as PP); soft polyvinyl chloride (rigid PVC); rigid polyvinyl chloride (rigid PVC); and the like.

In the cylindrical main body 2, a plurality of wood flour (wood portion) particles are bonded to each other by resin, and the particles are eroded at a portion in contact with the resin. Since the peripheral portions of the wood flour particles are infiltrated by the resin, the bonding strength between the resin and the wood flour particles is increased, thus allowing the wood flour to be resistant to moisture. The resin contains, as impurities, plaster, a heat insulating material, calcium carbonate, talc, pigment, PE, FRP and the like, which are contained in the wood waste material or the plastic waste material.

The mixing ratio of the raw materials for the cylindrical main body 2, namely, the plastic waste material (resin waste material ground powder K), the wood waste ground powder J, and impurities L which have been contained in the plastic waste material K and the wood waste material J, is shown in the Venn diagram in FIG. 3.

As shown in FIG. 3, 20 wt % or less of the entire cylindrical main body 2 is the impurities L. The ratio of a wood portion N contained in the wood waste material J, that is, a wood flour portion to allow the cylindrical main body to have features such as a wood-like feel and the like, is 51 to 75% with respect to the entire cylindrical main body 2, and the ratio of the resin portion P contained in the plastic waste material K is 10 to 45% with respect to the entire cylindrical main body 2.

The cylindrical main body 2 may be made of a mixed material containing fine cellulose powder particles, which are obtained from wood materials, and resin, and be formed into a structure which permits a bottle to be contained therein. This cylindrical main body has features similar to that of the above cylindrical main body 2, in other words, features such as a feel similar to natural wood, thus having wood-like features.

Here, the reason why the concentration of the wood portion N is set to 51 to 75 wt % is that, when the concentration is less than 51 wt %, it is difficult to allow the cylindrical main body to have features such as a feel similar to real wood, and that, when the concentration is more than 75 wt %, moldability of the cylindrical main body upon extrusion molding or the like is decreased due to an excessive concentration of the wood portion. It is possible to keep the wood flour in a molded product when the particle size of the wood flour is set to 1 to 300 μm, the wood flour particles are uniformly dispersed in the cylindrical main body 2, and resin is filled between the wood flour particles. Further, since part of the resin infiltrates into the wood flour particles, it is possible to improve capability to keep the wood flour as well as to prevent moisture from infiltrating into the wood flour. The reason why the concentration of the resin portion P is set to 10 to 45 wt % is that, when the concentration is less than 10 wt %, the moldability of the cylindrical main body upon extrusion molding or the like is decreased due to a deficient concentration of the resin portion, and that, when the concentration is more than 45 wt %, it is difficult to allow the molded cylindrical main body to have wood-like features due to excessive resin. Here, it is preferable that the concentration of the resin component P is 10 to 30 wt %. The reason why the concentration of the impurities is set to 20 wt % or less is that, when the concentration is more than 20 wt %, it is not easy to perform extrusion molding on the cylindrical main body, and that it is difficult to maintain a wood external appearance of the cylindrical main body 2 as a finished product.

A stick-shaped member as the supporting member 3 is provided in an inner circumferential wall portion in a lower end portion of such a cylindrical main body 2.

The stick-shaped member 3 is provided approximately horizontally as shown in FIG. 2B, to pass through and to be perpendicular to the center of the axis the center of the axis of the cylindrical main body 2. When the bottle M is inserted into the cylindrical main body 2, the bottom face Ma is in contact with the stick-shaped member 3, and thus the bottom face Ma of the bottle M is supported and the bottle M is kept in the cylindrical main body 2. Both end portions of the stick-shaped member are inserted into opposed holes formed in a lower end portion of the cylindrical main body 2, so that the stick-shaped member crosses the center of the inside of the cylindrical main body.

With regard to the actual dimensions of the bottle case 1, for example, the entire length of the cylindrical main body 2 is approximately 240 mm, the outer diameter is approximately 83 m, the inner diameter is approximately 76 mm, the thickness of the circumferential wall portion is approximately 3.5 mm, the diameter of the stick-shaped member 3 as a metal round stick is approximately 2 mm, the diameter of each hole 21 is approximately 11 mm, the length from the top end of the cylindrical main body 2 to the top edge of the hole 21 is approximately 10 mm, and the length from the bottom end of the cylindrical main body 2 to the bottom edge of the stick-shaped member 3 is approximately 5 mm. Here, the thickness of 3.5 mm of the circumferential wall portion is thick enough to hold, through the stick-shaped member 3, the bottle M inserted into the bottle case 1 made of a mixed material obtained by mixing the wood waste material ground powder obtained from a wood waste material containing impurities and the resin waste material ground powder obtained from a resin waste material containing impurities. The thickness is thick enough also to contain and keep the bottle. Moreover, the above dimensions similarly permit the cylindrical main body 2 made of a mixed material containing fine cellulose powder particles obtained form wood materials and resin to support, through the stick-shaped member 3, the bottle M inserted thereinto, and the thickness thereof is thick enough to contain and keep the bottle.

According to the bottle case, the bottle case includes: the cylindrical main body 2 made of a mixed material containing fine cellulose powder particles obtained from wood materials and resin; and the supporting member 3 to support the bottom face of a bottle inserted into the cylindrical main boy 2. Therefore, when chips or sawdust of a building wood material generated at a construction site are used for the wood material for the bottle case, it is possible to avoid cutting natural trees as well as to permit the bottle case to have features such as a feel similar to natural wood, that is, wood-like features, and keep a bottle such as a wine bottle inserted therein. Moreover, since it is possible to insert and keep a wine bottle in the cylindrical main body 2 having wood-like features, the wine kept in the cylindrical main body looks like a wine which costs, for example, 5000 to 10000 yen, even when the actual cost of the wine may be 1000 to 3000 yen.

Figure 4:
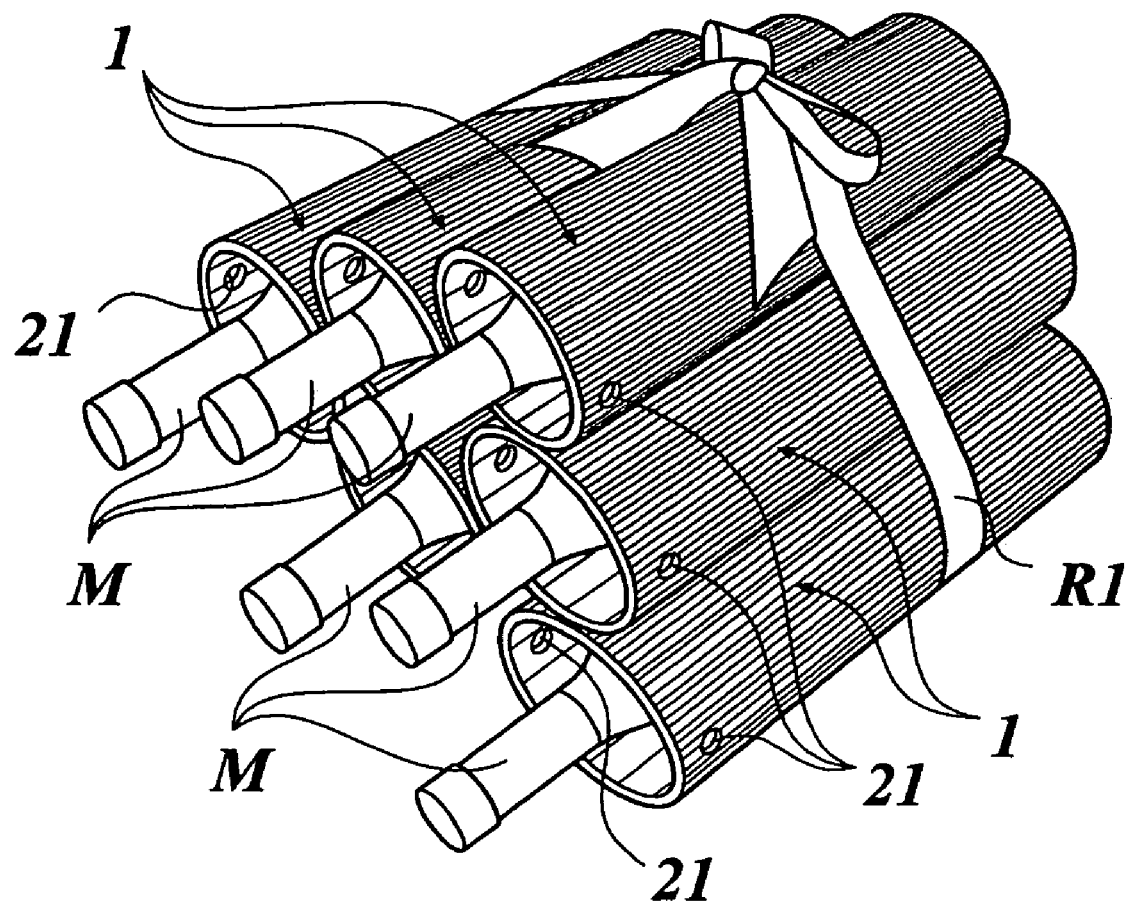
FIG. 4 is a view showing a state where the bottle cases in FIG. 1 are used as a rack.

The bottle case 1 thus produced may be used as a bottle rack by stacking a plurality of bottle cases 1 and fix the plurality of bottle cases 1. For example, as shown in FIG. 4, a plurality of bottle cases 1 may be stacked in a pyramid shape, and integrally bound with the ribbon R or the like, thus producing a bottle rack having relaxing wood-like features and capable of containing a plurality of bottles. In this way, it is possible to contain and keep a plurality of bottles by inserting the plurality of bottles in the cylindrical main bodies 2, and the bottles can be used as decoration when placed in a room, a shop, on a shelf, and the like.

Next, a manufacturing method of the cylindrical main body 2 of the bottle case 1 will be described with reference to FIG. 6. Here, the cylindrical main body 2 is manufactured by a manufacturing apparatus which includes an extrusion molding device 30, a sizer member 40, a crushing device 102, an eddy current separator device 103, a powerful magnet 103, a gravity separator device 103, a crushing device 104, a grinding device 106, a blending mixer 108, an inorganic pigment feeding portion 109, a crushing device 116, a cutting device 117, a coating device, and the like.

First, upon rebuilding or the like, building components used as a building body and the like are separated into a wood collection member which is a wood-based material, namely, a wood waste material, and into a resin collection member which is a resin-based material, namely, a resin waste material, to be collected. Needless to say, building members to be collected include not only waste materials obtained upon demolition of an old building, but also waste materials generated upon construction of a new building, and the like. Those materials may be separated manually, by a machine which sorts out materials according to the properties thereof, and the like. In the stage where the separation work is finished, the building members have been broken into fragments through removal work of building members, disassembling work thereof, and the like.

Prior to crushing of each of the wood waste material and the resin waste material, weights of the members constituting each waste material are measured. First, for example, the collected wood waste material and the resin waste material are put into feed containers capable of feeding the wood and resin waste materials into the crushing devices 102 and 116, respectively. The feed container may be included in each of the crushing machines 102 and 116.

An example of the wood waste material is a wood panel used for, for example, panel construction. A wood panel includes: a frame body constituted by arranging frame members vertically and laterally to form a rectangular frame, and providing supplementary bar members vertically and laterally in the rectangular frame; and a surface member such as plywood attached to at least one of the front and back sides of the frame body.

Then, the weights of the waste materials provided in the feed containers and the weights of the impurities contained in the waste materials are measured.

Checking in advance the weights of each of the constituent materials constituting each of the waste materials makes it possible to determine the weights of the impurities contained in the waste materials.

In other words, the entire weight of a wood waste material is the total weight of constituent members constituting the wood waste material, and the weight of the impurities contained in the wood waste material is the total weight of the constituent members other than the wood members. For example, when a wood waste material containing impurities is a wall body made up of a wall panel, the weight of the impurities is the sum of the weights of the plaster board, the heat insulating material provided in the frame member, nails, and the like, which is calculated by subtracting the weight of the wood portion (wood panel) from the total weight of the wood waste material containing the impurities.

Similarly, as for the resin waste material put into the feed container, checking in advance the total weight of the resin waste material and the weight of materials other than the resin-based materials makes it possible to determine the weight of the impurities. When the ratio and the weights of the constituent members of a resin product to be a resin waste material are known beforehand, it is possible to determine the weight of the resin portion and the weight of the impurities.

Thereafter, as shown in the conceptual view of the manufacturing apparatus in FIG. 6, fragments of well-broken wood waste material, for example, the wood waste material broken into chips of approximately 4 to 5 cm in size, are crushed to be several millimeters in size (first crushing step A).

The crushing device 102 used in the first crushing step A includes a crushing function to produce large chips each having a size of approximately several millimeters. More specifically, the crushing device 102 may include a plurality of projections on surfaces of two rollers opposed to each other, and crush objects passing through between the rollers, by rotating the rollers while applying a pressure between the rollers. It goes without saying that the crushing device 102 is not limited thereto, and any crushing device for crushing may be used as long as the crushing device has a function similar to the above. For example, any other crushing device such as a jaw crusher which crushes, by applying a pressure, a raw material provided between an upwardly open V-shaped jaw and a vibration jaw, and a gyratory crusher which sequentially crushes a raw material with a movable crushing surface gyrating in a fixed crushing surface.

Subsequently, metals which are attracted to the powerful magnet 103 are separated from the wood waste material chips, and metals which are not attracted thereto but have conductivity are separated by the eddy current separator device 103. Further, metals, stones and the like which have not been separated by the magnetic separation are separated by the gravity separator device 103 (separating step B).

Here, the ratio of the total weight of the impurities contained in the wood waste material and the resin waste material to be mixed later is set to be 20 wt % or less with respect to the total weight of the wood and resin waste materials.

In other words, the weight of the impurities in the resin waste material is added to the weight of the impurities obtained by subtracting, from the pre-obtained total weight of the impurities in the wood waste material, the weights of the metals, stones and the like separated by the eddy current separator device 103 and the gravity separator device 103.

For example, when the wood waste material is a wall panel, the impurities therein are plaster and a heat insulating material. The total weight of the impurities including the plaster, the heat insulating material, and the impurities in the resin waste material such as calcium carbonate, talc, pigment, PE, and FRP, is adjusted to be 20 wt % or less. Here, when resin is contained in the wood waste material, the weight of this resin is not added to the weight of the impurities as a whole. Moreover, when a wood portion such as wood flour is contained in the resin waste material, the weight thereof is not added to the weight of the impurities.

Next, in a second crushing step C, the first crushed materials which have been subjected to the first crushing step A are crushed to produce fine chips. The crushing device 104 used in the second crushing step C is capable of crushing large chips to produce fine chips of 1 mm in size. More specifically, there may be used a hammer mill to crush the material by hammer tips rotating at a high speed and repeat the crushing operation until the chips passes through a round hole in a screen disposed at the periphery of the hammer tips. Needless to say, the crushing device 104 is not limited to the above-mentioned hammer mill, and any crushing device may be used as long as the crushing device has a function similar to the above. For example, a cutter mill to cut the material using a cutter, a roll mill to crush the material by applying a pressure thereto with a roller, or the like may be used.

Next, in a third grinding step D, the second crushed materials which have been subjected to the second crushing step C are ground to produce wood waste material ground powder J. The grinding device 106 used in the third grinding step D is capable of grinding the materials obtained through the second crushing step C, to produce fine powder.

More specifically, the grinding device may be a so-called pin mill, which is capable of grinding a material finely by utilizing impact and rebound, through pins attached to a disk. To be more concrete, the pin mill includes a disk-shaped rotary disk having a plurality of pins vertically provided thereto, and a fixed disk having a plurality of pins on a surface facing the rotary disk. When materials obtained through the second crushing step C are fed into a central portion of the rotary disk, the materials enter into gaps between the pins on the rotary disk and the fixed disk due to centrifugal force, and are ground to be fine powder due to interaction between impact and rebound from the pins. In this third grinding step D, the materials are ground into particles of approximately 500 micron meters in size by the above-described pin mill. It goes without saying that the grinding device D is not limited to the pin mill, and any grinding device having a function similar to the above, for example, a ball mill, a stone mill or the like, may be used.

In the crushing steps A and C and the grinding step D as described above, the collected wood waste material 101 is crushed and ground stepwise and efficiently through three steps.

With respect to the wood waste material ground powder subjected to the crushing steps A and C and the grinding step D, particles having mean particle size of 300 micron meters are separated using a screen with pores of 500 micron meters in size. In other words, the wood waste material ground powder is passed through a screen 107, and particles of 500 micron meters or more in size are returned to the grinding device 106 to be re-ground.

The amounts of the wood waste material ground powder J with a mean particle size of 300 micron meters and inorganic pigment with a size of several micron meters are measured as appropriated with an automatic measuring device of a load-cell type, fed into the blending mixer 108 pre-heated by an oil heat adjusting device, and stirred at a temperature of 175° C. while generating heat by self heating (frictional heating). At this time, by feeding inorganic pigment from the inorganic pigment feeding portion 109 into the blending mixer 108, the inorganic pigment is coated around the wood flour (wood portion) of the wood waste material ground powder.

Meanwhile, resin waste material ground powder K is obtained by roughly crushing the resin waste material 110 using the crushing device 116 such as a hammer mill.

Then, the obtained resin waste material ground powder K is fed into the blending mixer 108 where the wood waste material ground powder J and the inorganic pigment are mixed, and stirred at 185° C. Through the stirring, the mixture is kneaded at a low speed after rotated at a high speed, to produce the mixed material 112 (a mixing step E).

At this time, the wood flour (wood portion) N in the wood waste material ground powder J makes up 51 to 75 wt % of the entire product to be molded, the resin portion in the resin waste material makes up 10 to 45 wt % of the entire product to be molded, and the impurities as a whole make up 20 wt % or less of the entire product to be molded.

Subsequently, the mixed material 112 is fed into the extrusion molding device 30, filled in a die 34 using a screw 32, and subjected to extrusion molding (a molding step F).

The extrusion molding device 30 is, for example, a bending-type extrusion molding device. The extrusion molding device 30 includes, as shown in FIG. 7, a cylindrical cylinder 31, the screw 32 provided in the cylinder 31, a hopper 33 which is provided at a rear end portion of the cylindrical cylinder 31 and to which the mixed material is supplied, and the die 34 which is provided at a top portion of the cylinder 31 and allows a pellet melted object to be formed in to a desired shape.

Figure 7:
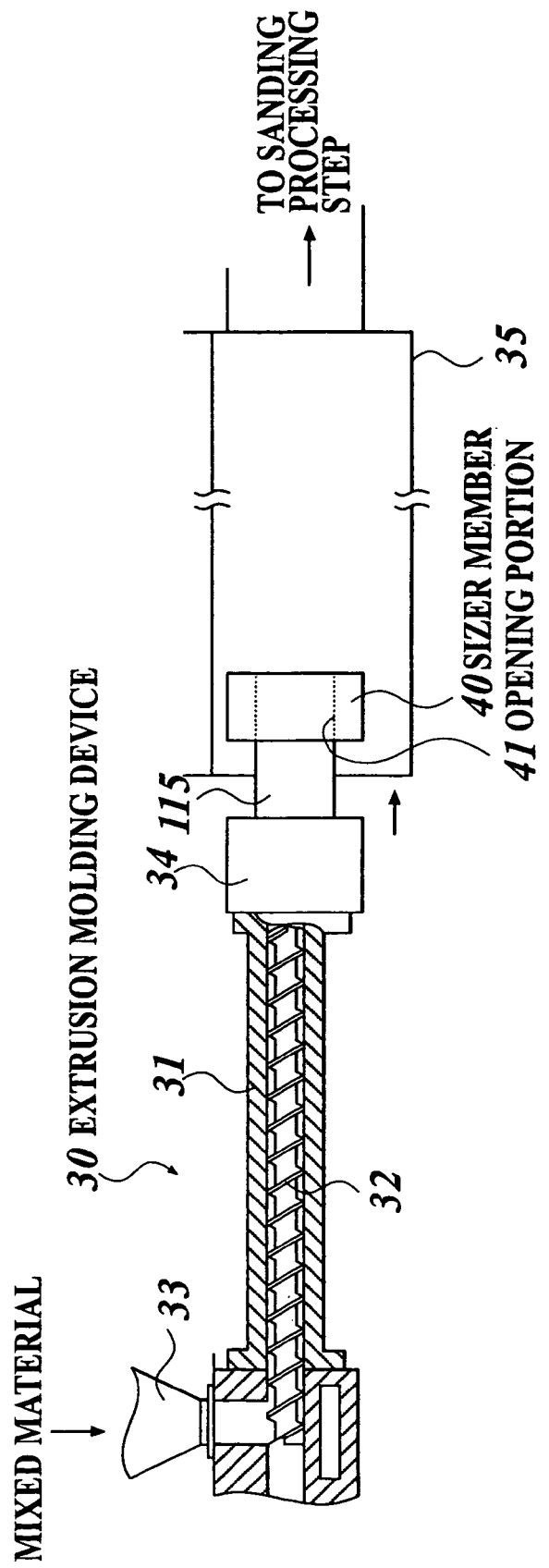
FIG. 7 is a schematic structural view showing an extrusion molding device of the manufacturing apparatus.
Figure 8:
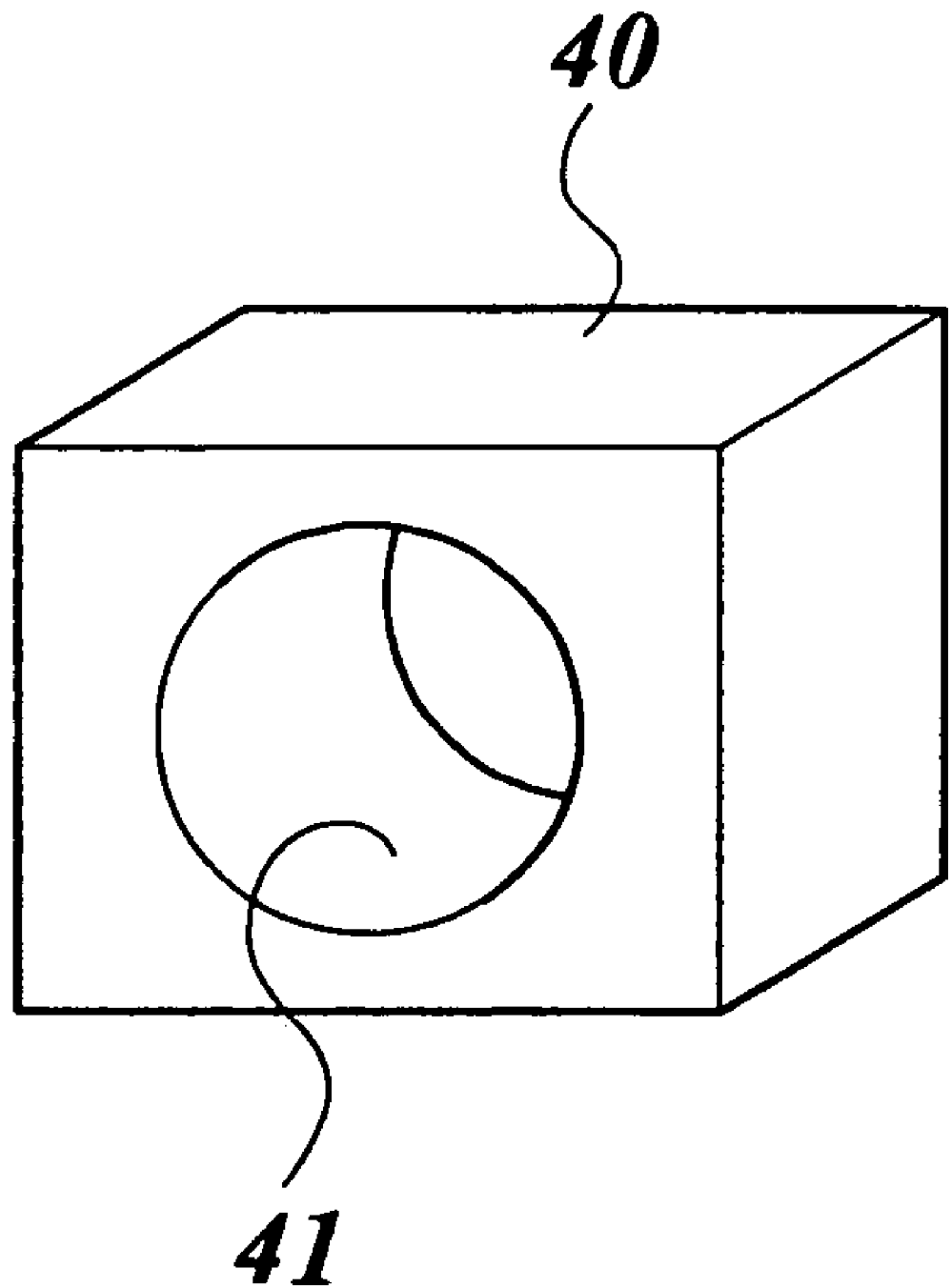
FIG. 8 is a schematic structural view showing a sizer member of the manufacturing apparatus.

As shown in FIG. 7, the mixed material supplied to the hopper 33 is fed into the cylinder 31, extruded forward by the screw 32 while subjected to heat melting, and extruded from the die 34. Thus, an extrusion mold product 115 in a desired shape, a cylindrical shape here, is manufactured.

In other words, the die 34 is a die for a pipe and a tube, and includes a molding portion having a core to mold the inner diameter of the cylindrical main body 2, to mold an extrusion molding to be molded, namely, the cylindrical main body 2. The mixed material 112 is filled into the molding portion and extruded to produce the extrusion mold product 115 in a desired shape, a long cylindrical shape here. Here, the molding temperature is set to 180 to 220° C., and molding is performed under this molding temperature. The reason why the molding temperature is set to 180 to 220° C. is that resin is not softened enough under a temperature of less than 180° C., and thus it is difficult to evenly mix the resin with the wood flour. When the temperature is 220° C. or more, the wood flour is altered through carbonization or the like due to heat.

Next, in a cooling device, here a water tank 35 containing water, the extrusion mold product 115 extruded in a cylindrical shape from the die 34 is cooled, and the shape of the cooled extrusion molded produce 115 is adjusted through a sizer member 40 (a sizer step).

The sizer member 40 includes an opening portion 41 having the same outer and inner diameters as those of the extrusion mold product to be molded, namely, the cylindrical main body 2, and when the extrusion mold product 1 15 is inserted into the opening portion 41, the shape and dimensions of the extrusion mold product 115 are adjusted. That is, the extrusion mold product 115 is formed into a cylindrical object having a desired shape and dimensions while being cooled. Here, the extrusion mold product 115 is allowed to have the dimensions described above. More concretely, the entire length of the cylindrical main body 2 is approximately 240 mm, the outer diameter is approximately 83 m, the inner diameter is approximately 76 mm, and the thickness of the circumferential wall portion is approximately 3.5 mm. The extrusion mold product 115 is a product to be the cylindrical main body 2, and substantially the same thing. As described later, the extrusion mold product 115 is cut into a predetermined length to produce the cylindrical main body 2. Here, the sizer member 40 is provided in the water tank; however, the place thereof is not limited thereto. The sizer member 40 may be provided: at the outlet of the die 34 with a predetermined space therebetween; between the die 34 and the water tank 35, that is, for example, at the inlet of the water tank 35; or the like, so that the extrusion mold product 115 to be extruded from the die 34 is exposed to the outside air to be cooled once, inserted into the sizer member 40, and then cooled in the water tank or the like.

Subsequently, the surface of the extrusion mold product 115 formed as described above is subjected to sanding processing (a surface processing step G). That is, by sanding the surface of the surface portion of the extrusion mold product 115 with a sanding paper, a pattern with a plurality of streaks is formed.

Thereafter, in a cutting step H, the extrusion mold product 115 is cut into a predetermined length with the cutting device 117 in accordance with the movement of the extrusion mold product 115 on a roller conveyer (not shown). The cutting device 117 includes the roller conveyer (not shown), a cutter member (not shown), a cutter moving member (not shown) to move the cutter member in synchronization with the speed of extruding the extrusion mold product, and the like. Thus, it is possible to cut the extrusion mold product into on the roller conveyer into a predetermined length in accordance with the movement of the extrusion mold product.

A plurality of cylindrical main bodies 2 formed by cutting the mold product by the cutting device 117 are coated with the coating device (not shown), and then the coated cylindrical main bodies 2 are conveyed into a drying device (not shown) to be dried.

The coating device is, for example, a device to make the surface of the cylindrical main body 2 glossy. The coating device includes a roller conveyer (not shown) connected to the roller conveyer (not shown) of the cutting device 117, and a plurality of nozzles (not shown). The coating agent is applied through the nozzles onto the extrusion mold product conveyed on the roller conveyer. The drying device includes a drying region where the cylindrical main body 2 is conveyed from the coating device and dried. The drying region is, for example, surrounded by walls, and the inside thereof is kept in a predetermined dried state by an air conditioning device (not shown).

Through these steps, the cylindrical main body 2 of the bottle case 1 is obtained using the collected wood waste material and resin waste material.

Moreover, utilization of the wood waste material and the resin waste material is advantageous in view of effective use of resources and environmental protection.

The surface of the cylindrical main body 2, that is, the outer circumferential surface, is sanded through sanding processing. It is therefore possible to give a coarse feel to the surface, thus permitting the cylindrical main body to have a feel much closer to natural wood. Accordingly, the quality of the external appearance can be improved.

With respect to the cylindrical main body 2 thus molded, since impurities contained therein make up 20 wt % or less of the entire molded product, moldability in extrusion molding or the like is high, while wood-like external appearance is maintained. Moreover, since the cylindrical main body contains relatively large amount of impurities, the cylindrical main body is advantageous in view of effective use of resources and environmental protection. Furthermore, since the wood portion of the wood waste material makes up 51 to 75 wt % of the entire molded product, wood flour in the wood waste material ground powder can be contained in the molded product to make up 51 to 75 wt % of the entire molded product. Therefore, it is possible to give features such as a feel similar to a real wood. Moreover, since a large part of the wood portion is used, the percentage of re-use of wood waste materials can be improved.

Moreover, since the resin portion of the resin waste material makes up 10 to 45 wt % of the entire molded product, resin powder in the resin waste material ground powder can be contained in the molded product to make up 10 to 45 wt % of the entire molded product. Therefore, it is possible to give strength and rigidity to the molded product, and, when performing extrusion molding in the molding step F, the moldability of the molded product is enhanced. Moreover, since the particle size of the wood flour is 1 to 300 μm, moldability upon extrusion molding and the like is good, and the wood flour can be evenly dispersed in the molded product. Since fine particles of the wood flour appear on the surface of the molded product, the surface thereof becomes smooth, and the surface processing after molding becomes easy.

Furthermore, since the molding temperature in the molding step is set to 160 to 220° C., the wood flour in the wood waste material ground powder obtained in the grinding step is not altered regardless of the heat. In addition, the resin powder in the resin waste material ground powder can be softened enough, thus permitting the wood flour and the resin powder to be evenly mixed. In this way, it is possible to obtain the cylindrical main body 2 easily and surely.

The bottle case 1 is formed by providing the stick-shaped member 3 at the bottom portion of the cylindrical main body 2 thus molded.

In the bottle case 1 in this embodiment, the stick-shaped member 3 is used as a supporting member. However, the supporting member is not limited thereto, and any member is used as long as the supporting member supports the bottom face Ma of the bottle M to be inserted in the cylindrical main body 2.

Figure 9A:
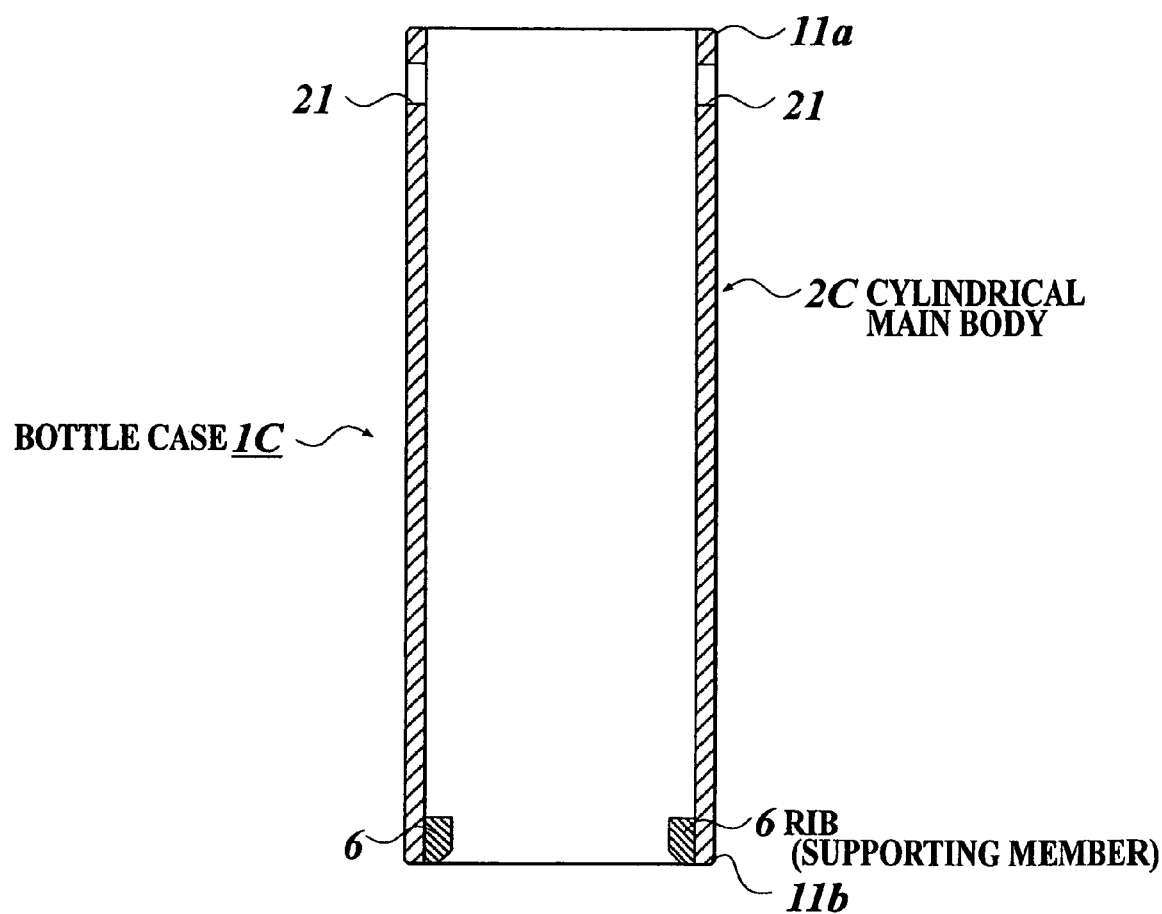
Figure 9B:
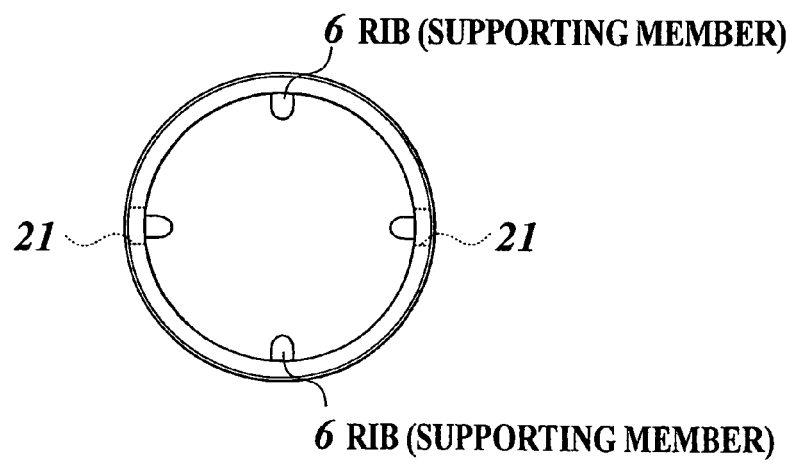
Figure 10:
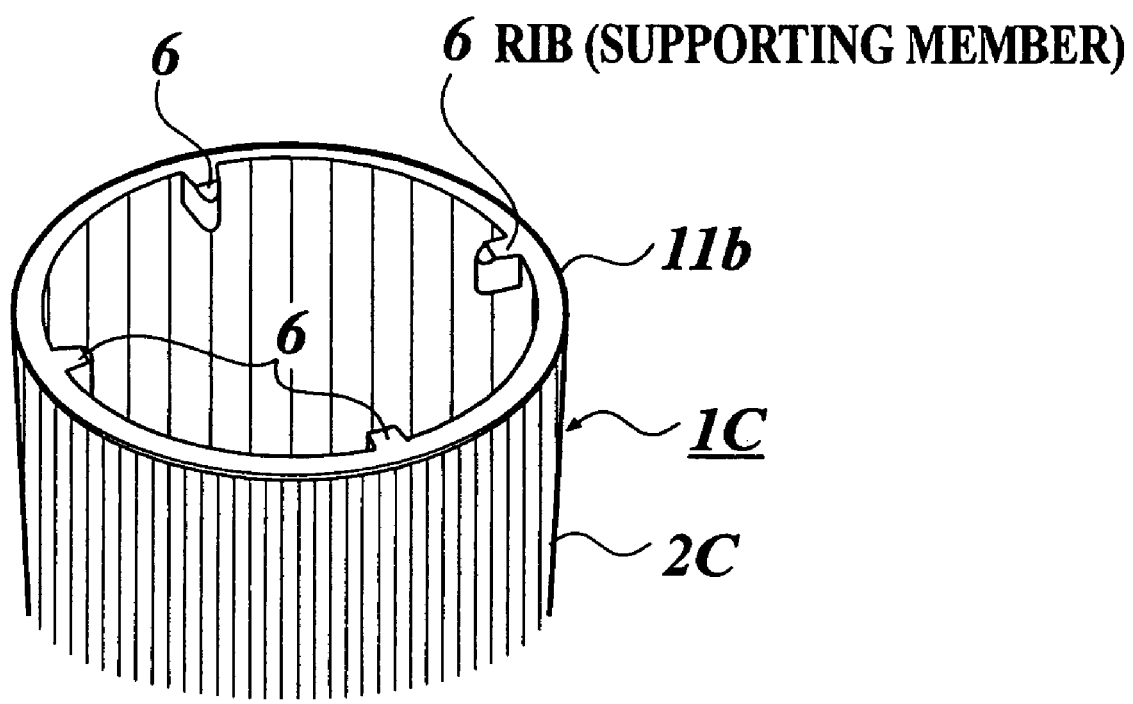
FIG. 10 is a view of the bottle case in FIG. 9 viewed from the bottom.

For example, as shown in FIGS. 9A, 9B and 10, the bottle case may be produced by forming a cylindrical main body 2C in a similar way to that of the cylindrical main body 2, and providing a plurality of ribs 6 each projecting in the axial direction along the inner circumferential wall in a lower end portion of the cylindrical main body 2C.

More specifically, a bottle case 1C shown in FIGS. 9A, 9B and 10 is made of a mixed material formed by mixing wood waste material ground powder obtained from a wood waste material containing impurities and resin waste material ground powder obtained from a resin waste material containing impurities. The bottle case 1C includes the cylindrical main body 2C which permits a bottle to be inserted therein, and the plurality of ribs 6 which are integrally formed therewith to support the bottom face of the bottle inserted in the cylindrical main body 2C.

The ribs 6 are provided so as to project to taper toward the top end portion thereof in a direction of the center of the axis, and be extended in the axial direction of the cylindrical main body 2C on the inner circumferential wall in a lower end portion of the cylindrical main body 2C. The top faces of the ribs are substantially horizontal, and, in view of each bottom face portion thereof, an end portion of each projection is inclined. Thus, when the bottle M is inserted in the cylindrical main body 2C, the periphery of the bottom face Ma of the bottle is in contact with the top faces of the ribs 6, and the bottle is supported and contained in the cylindrical main body 2C. Moreover, in opposed circumferential wall portions in an upper portion of the cylindrical main body 2C, formed are the holes 21 through which the inner side and the outer side of each of the circumferential wall portions are communicated with each other. The operation of the bottle case 1C is similar to that of the bottle case 1, thus a description thereof is omitted.

When the ribs 6 are integrally formed with the cylindrical main body 2C as in the case of the bottle case 1C, the cylindrical main body 2C is produced by, for example: performing extrusion molding using a die capable of molding an extrusion mold product with ribs; molding a cylindrical extrusion mold product having a plurality of projection portions which are provided on the inner circumferential wall and extended in parallel with the axial direction; cutting the extrusion mold product into a predetermined length; and leaving the projection portions of the cylindrical main body 2C only at the lower end portion of the inner circumferential wall.

In the manufacturing method of the cylindrical main body 2 in this embodiment, impurities are contained in the mixed material 112 which is used to produce the cylindrical main body 2. However, even when impurities are not contained in a mixed material for producing a cylindrical main body, in other words, when the cylindrical main body is made of a mixed material containing fine cellulose powder particles obtained form wood materials and resin, the cylindrical main body being capable of inserting a bottle therein, the cylindrical main body can be produced using the devices in the steps A to H. More specifically, without calculating the ration or the like of the impurities with respect to the entire product, and without the separating step B, fine cellulose powder particles are obtained by crushing and grinding a wood material in the steps A to D, the fine cellulose powder particles and resin are melted to be mixed in the mixing step E, and extrusion molding is performed using the extrusion molding device 30 in the molding step F, thus producing a cylindrical mold product. In this case, it is possible to mold the cylindrical main body using the fine cellulose powder particles obtained from a wood waste material. Accordingly, chips or sawdust of a wood material generated at a construction site can be utilized. That is, without using natural resources, a bottle case having features such as a texture similar to wood and wood-like feel and appearance.

Figure 5A:
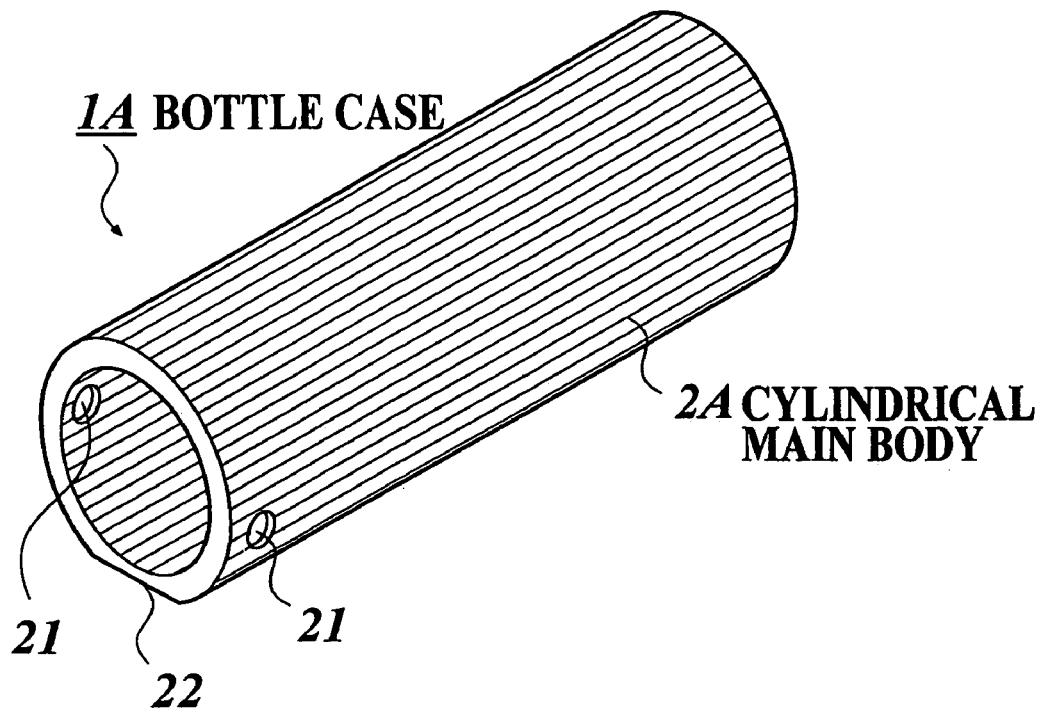

In the bottle case 1, the shape of the cylindrical main body 2 is cylindrical. However, the shape thereof is not limited thereto, and, for example, as shown in FIG. 5A, in the bottle case 1A, a flat face portion 22 extending along the axial direction may be formed on part of the outer circumferential surface of the cylindrical main body in a cylindrical shape. When the bottle case 1A includes the flat face portion 22 on the outer circumferential surface of the cylindrical main body 2A, it is possible to lay down the bottle case 1A to place on a predetermined place, for example, on a shelf or a table, in a stable manner.

Figure 5B:
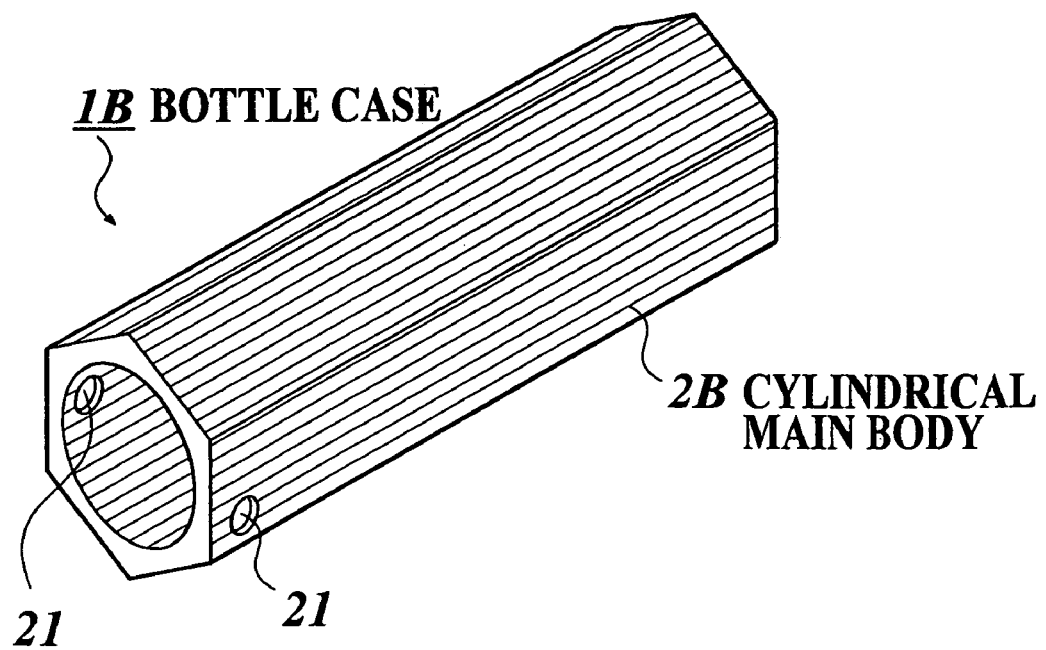

Moreover, as shown in FIG. 5B, the cylindrical main body may be a cylindrical body of which a sectional view is polygonal. In a bottle case 1B in FIG. 5B, a cylindrical main body 2B is a cylindrical body in a hexagonal shape.

With the bottle case 1B including the polygonal cylindrical main body 2B, it is possible to lay down the bottle case 2B to place on a predetermined place, for example, on a shelf or a table, in a stable manner. Moreover, by stacking a plurality of bottle cases 1B such that the outer surfaces thereof are in contact with each other, and tying the cases with a ribbon or the like, the cases can be stacked in a stable manner, thus forming a rack capable of containing and keeping a plurality of bottles.

The sections of all of the inner circumferential walls of the cylindrical main bodies 2, 2A and 2B are in annular. However, the shape thereof is not limited thereto. The section may be, for example, in a polygonal shape with three or more sides, an oblong shape or the like, in view of the sectional shape of the inner diameter. Further, in the above, the section of the inner circumferential wall is circular; however, the shape thereof is not limited thereto. The shape of the section may be in any shape as long as the case is a tubular case in which a bottle such as a wine bottle can be inserted to be kept therein.

Furthermore, the cylindrical main bodies 2, 2A and 2B of the bottle cases 1, 1A and 1B may have a cut-out portion, an opening portion and the like.

Modifications of the cylindrical main bodies of the bottle cases, in which a cut-out portion and an opening portion are formed, are shown in FIGS. 12 to 18.

Figure 12:
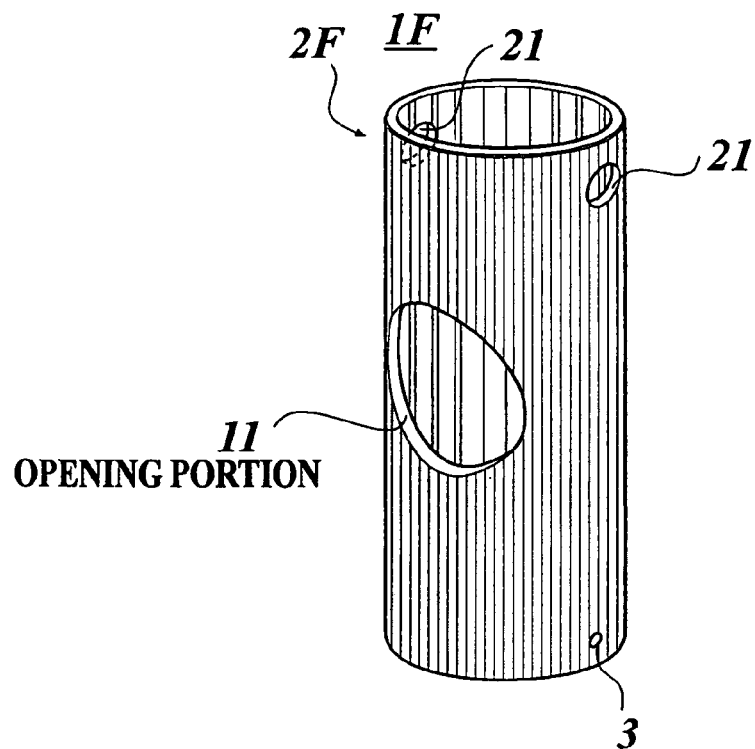
FIG. 12 is a perspective view showing a modification of the bottle case to which the present invention is applied.

A bottle case 1F shown in FIG. 12 includes a cylindrical main body 2F in a cylindrical shape, which is molded by the extrusion molding device 30 or the like using a mixed material in a similar way to that of the cylindrical main body 2 of the bottle case 1. An opening portion 11, which communicates with the inside of the cylindrical main body 2F and from which the bottle inside the case is seeable, is formed on the cylindrical main body 2F. In an inner circumferential wall portion at a lower end portion of the cylindrical main body 2F, a stick-shaped member 3 is provided as a supporting member to support the bottom face of the bottle inserted in the case. This stick-shaped member 3 is similar to that of the bottle case 1, and the stick-shaped member 3 is provided between opposed portions at the lower end portion of the cylindrical main body 2F.

The opening portion 11 is formed in a substantially central portion of the cylindrical main body 2F so as to be perpendicular to the holes 21 and to communicate with the inside of the cylindrical main body 2F. Here, the size of the opening portion is large enough for a central portion of the bottle inserted in the cylindrical main body 2F to be exposed to the outside.

Thus, when a bottle such as a wine bottle with a label adhered on the central portion of the bottle is inserted in the bottle case 1F, the central portion of the wine bottle, that is, the brand thereof, inserted in the bottle case 1F is visually recognizable from the outside through the opening portion 11. Accordingly, it is advantageous to keep a wine bottle in the bottle case 1F in view of effective use of natural resources and environmental protection since there is no need to cut natural trees. Moreover, it is possible to keep a bottle in the bottle case 1F having features such as a feel similar to natural wood, in other words, relaxing wood-like features. Furthermore, it is possible to visually recognize the wine bottle kept in the cylindrical main body 2F through the opening portion 11 without taking the bottle out therefrom. Here, the operations of the constituent features such as the holes 21 are similar to those described above, and thus a description thereof is omitted.

Figure 13:
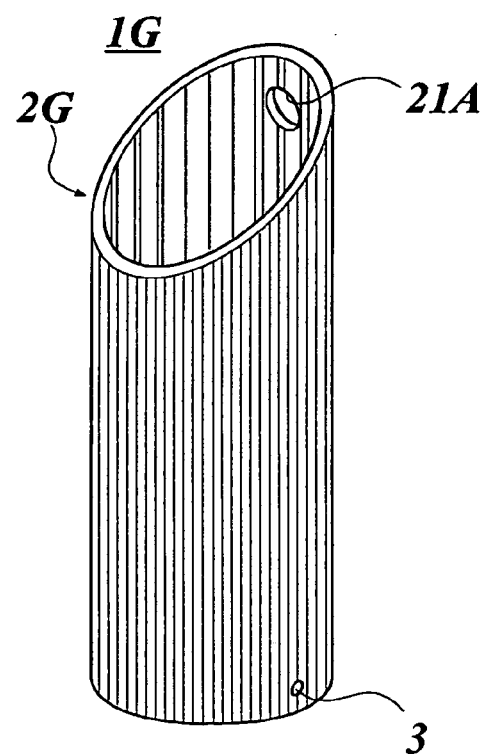
FIG. 13 is a perspective view showing a modification of the bottle case to which the present invention is applied.

A bottle case 1G shown in FIG. 13 is molded by the extrusion molding device 30 or the like using a mixed material as in a case of the cylindrical main body 2 of the bottle case 1. The bottle case 1G includes: a cylindrical main body 2G of which a top end portion is obliquely cut out so that the top end thereof is sharpened like a bamboo spear; and a supporting member (stick-shaped member) 3 to support the bottom face of a bottle when the bottle is inserted in the cylindrical main body 2G; and the like.

In a circumferential wall portion in the vicinity of the top end of the cylindrical main body 2G, formed is a hole 21A which allows the inner side and the outer side of the cylindrical main body 2G to communicate with each other. A ribbon or the like is inserted into this hole 21, and the ribbon is tied in a desired shape, thus permitting the cylindrical main body 2G to be decorated as in the case of the above-described hole 21. The inclination angle of the oblique top end portion of the cylindrical main body 2G with respect to the axial direction may be any angle, such as 30° or 45°.

Figure 14A:
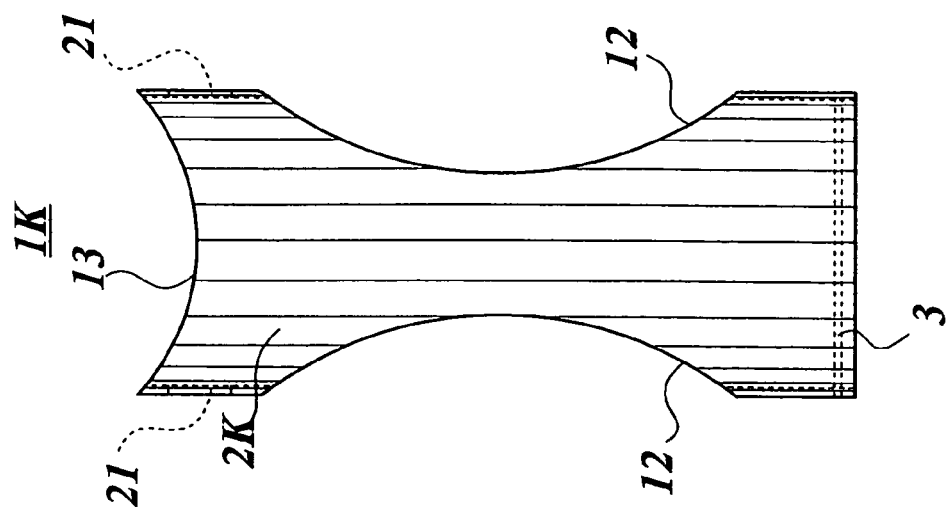

A bottle case 1H shown in FIG. 14A includes a cylindrical main body 2H, and a supporting member 3 (stick-shaped member) 3 to support the bottom face of a bottle when the bottle is inserted in the cylindrical main body 2H, and the like.

The cylindrical main body 2H includes opening portions 12 communicating with the inside thereof, which are formed by cutting out opposed central portions of the cylindrical main body 2H, in the same directions as those of the holes 21 provided in top end portions of the cylindrical main body. The opening portions 12 are vertically long. The stick-shaped member 3 is similar to that of the bottle case 1, and provided between the opposed portions at lower end portion of the cylindrical main body 2H.

Figure 14B:
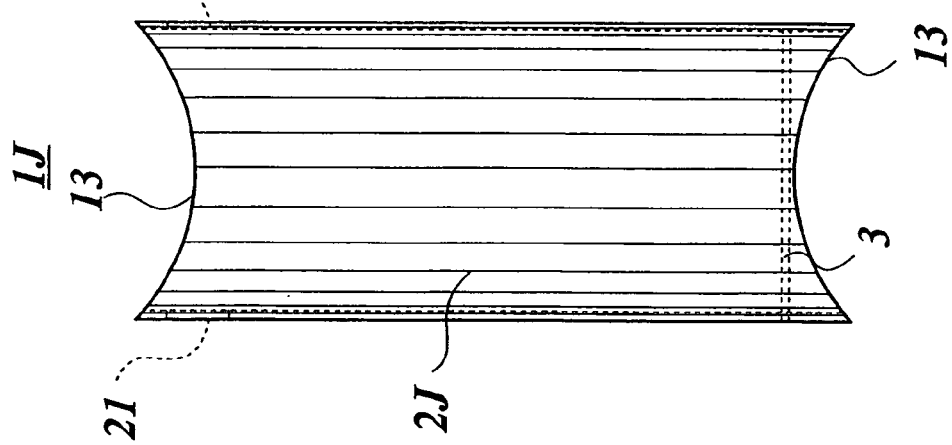

A bottle case 1J shown in FIG. 14B includes: a cylindrical main body 2J formed by cutting out (shown as cut-out portions 13, 13 in FIG. 13B) the top and bottom ends of the cylindrical main body 2 of the above-mentioned bottle case 1 into a circular arc shape when viewed from a side of the case; and a supporting member 3 to support the bottom face of a bottle inserted in the cylindrical main body 2J.

The stick-shaped member 3 is similar to that of the bottle case 1, and provided between the opposed portions at lower end portion of the cylindrical main body 2J above the cut-out portion 13 at the lower end of the cylindrical main body 2J.

Figure 14C:
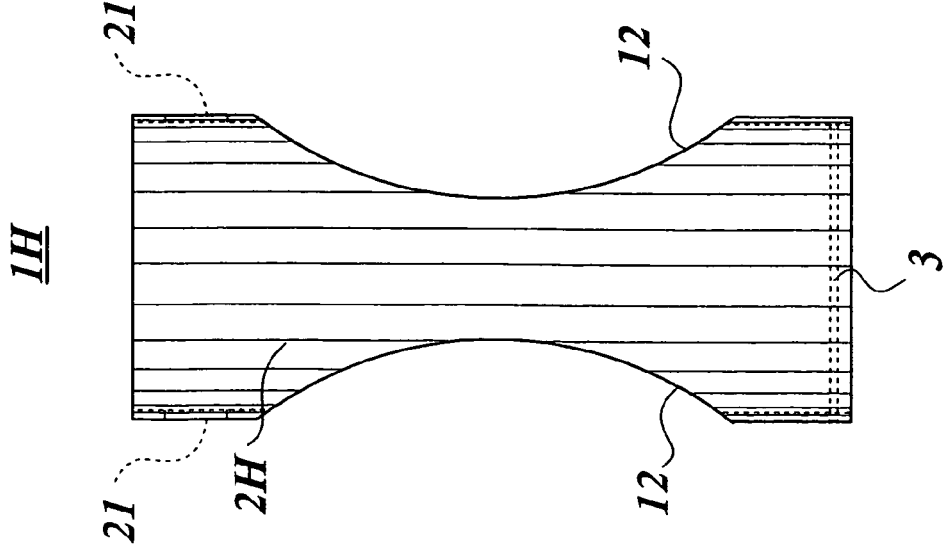

A bottle case 1K shown in FIG. 14C includes: a cylindrical main body 2K prepared by forming an opening portion 12 by cutting out a central portion of the cylindrical main body 2 as in a case of the cylindrical main body 2H of the bottle case 1H, and cutting out the top end of the cylindrical main body into a circular arc shape when viewed from a side of the case as in a case of the cylindrical main body 2J of the bottle case 1J; and the above-described supporting member (stick-shaped member) 3.

The stick-shaped member as the supporting member 3 is similar to that of the bottle case 1, and provided between the opposed portions at lower end portion of the cylindrical main body 2K.

A bottle case 1L shown in FIG. 15A includes: a cylindrical main body 2L formed by obliquely cutting out the top and bottom ends of the cylindrical main body 2 from one side to the other side thereof when viewed from a side thereof, toward the central direction thereof; and a rib (supporting member) 3P to support the bottom face of a bottle inserted in the cylindrical main body 2L. Here, in FIG. 14A, the cut-out portions at the top and bottom ends of the cylindrical main body 2L are shown as inclined portions 14, 14.

The rib (supporting member) 3P is provided on the inner wall at a lower end portion of the cylindrical main body 2L, along the lower end face thereof, so as to be perpendicular to the axial direction. With the bottle case 1L, when a bottle is inserted and kept in the cylindrical main body 2L, the top and bottom end portions of the bottle inside the cylindrical main body 2M are exposed to the outside through the inclined portions 14.

A bottle case 1M shown in FIG. 15B includes: a cylindrical main body 2M in a cut-out shape (shown as circular arc cut-out portions 15 in FIG. 14B) where the top and bottom ends of the cylindrical main body 2 are cut out on one side thereof when viewed from a side thereof; and a rib 3P as a supporting member provided on the inner wall at a lower end portion of the cylindrical main body 2M, along the lower end face thereof, so as to be perpendicular to the axial direction, as in the case of the bottle case 1L. With the bottle case 1M, when a bottle is inserted and kept in the cylindrical main body 2M, the top and bottom end portions of the bottle inside the cylindrical main body 2M are exposed to the outside through the circular arc cut-out portions 15.

A bottle case 1N shown in FIG. 15C includes: a cylindrical main body 2N which is molded in a similar way to that of the cylindrical main body 2, and provided with an opening portion 16 communicating with the inner side thereof, which is formed in a central portion thereof; and a stick-shaped member 3 as a supporting member to support the bottom face of a bottle inserted in the cylindrical main body 2N. The cylindrical main body 2N is formed to have a length shorter than that of the cylindrical main body 2, and the opening portion 16 includes a large opening extending almost entire length of the cylindrical main body 2N from top to bottom thereof.

In the bottle cases 1F to 1N shown in FIGS. 12 to 15, the opening portions 11 and 12, the cut-out portion 13, the inclined portion 14, the circular arc cut-out portion 15 and the opening portion 16 are formed in the cylindrical main bodies 2F to 2N, respectively. Accordingly, it is possible to keep bottles such as wine bottles inserted in the cylindrical main bodies 2F to 2N having features such as a feel similar to natural wood, in other words, relaxing wood-like features, without cutting natural trees, which is advantageous in view of effective use of resources and environmental protection. In addition, it is possible to visually recognize bottles kept in the cylindrical main bodies 2F to 2N though the opening portions 11 and 12, the cut-out portion 13, the inclined portion 14, the circular arc cut-out portion 15 and the opening portion 16, without taking out the bottles from the cases.

In particular, with regard to the bottle cases 1F, 1H, 1K and 1N, since the opening portions 11, 12 and 16 are formed in the central portions of the cylindrical main bodies 2F, 2H, 2K and 2N, it is possible to expose through the opening portions 11, 12 and 16 the central portions of the wine bottles inserted in the cylindrical main bodies 2F, 2H, 2K and 2N, to keep the wine bottles having labels showing brands or the like, which are generally adhered on the central portions of the bottles. Therefore, it is easy to visually recognize the labels of the bottles through the opening portions 11, 12 and 16 from the outside of the cylindrical main body 2F, thus permitting recognition of the brands of the wines kept therein.

Moreover, in the bottle case 1 of the embodiment, the stick-shaped member 3 is used as a supporting member. Both end surfaces of the stick-shaped member 3 are exposed to the outer circumferential portion of the cylindrical main body of the bottle case 1. However, the structure of the stick-shaped member is not limited thereto. Both end surfaces of the stick-shaped member may not be exposed to the outer circumferential portion of the cylindrical main body 2. An example thereof is shown in FIGS. 11A and 11B.

Figure 11A:
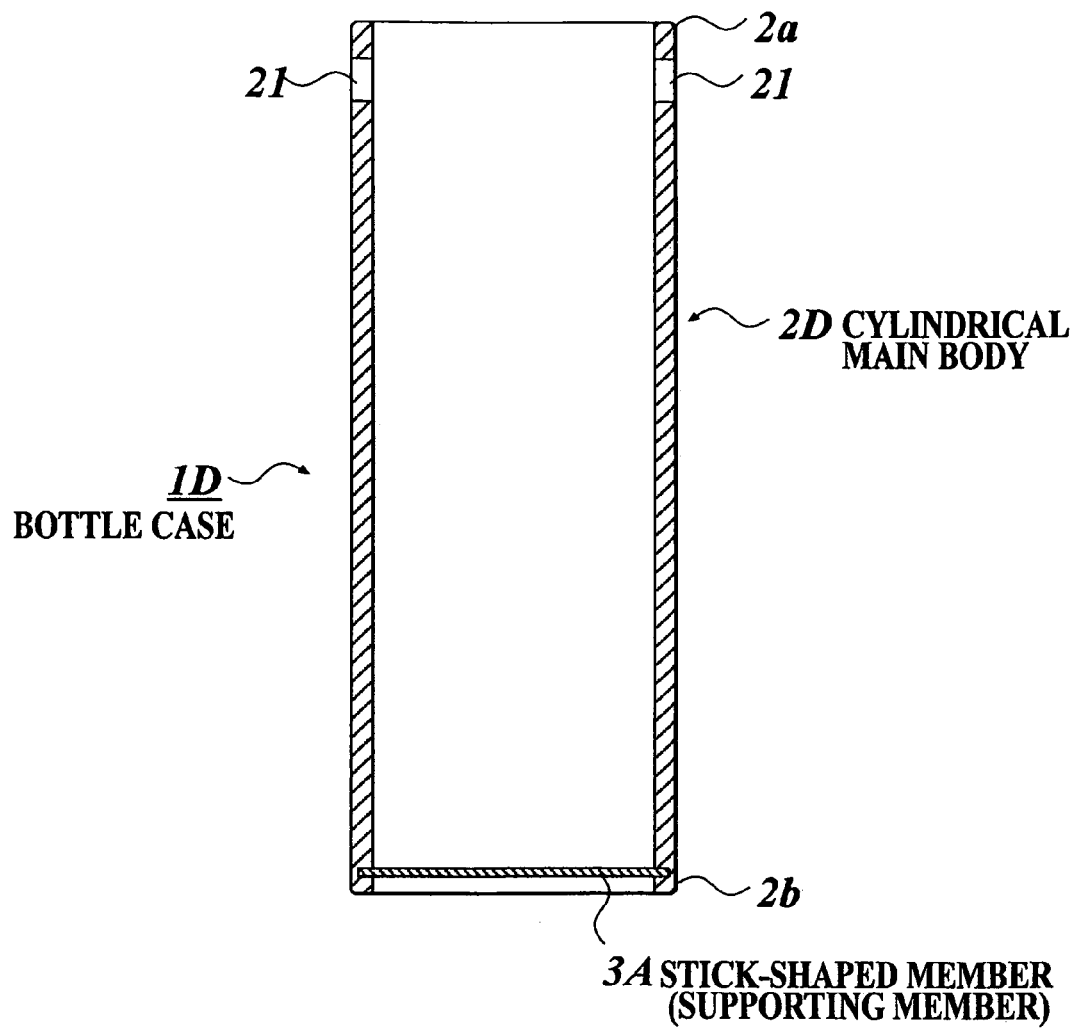
Figure 11B:
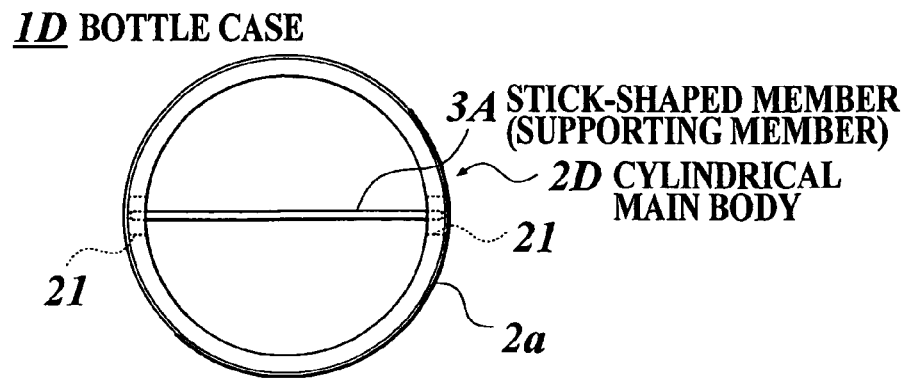

A bottle case 1D shown in FIGS. 11A and 11B has the same structure as that of the bottle case 1 except the bonded structure between both end portions of the stick-shaped member 3A and the cylindrical main body 2. The same reference numerals are designated to the same constituent elements, and thus descriptions thereof are omitted.

The bottle case 1D shown in FIGS. 11A and 11B is made of a mixed material formed by mixing a wood waste material containing impurities and a resin waste material containing impurities. The bottle case 1D includes a cylindrical main body 2D in which the bottle M can be inserted inside thereof, and a supporting member 3A provided in the cylindrical main body 2D, to support the bottom face Ma of the bottle M inserted in the cylindrical main body 2D.

In the circumferential wall at upper portions of the cylindrical main body 2, holes 21, 21 similar to the above-described holes are formed, and the stick-shaped member (supporting member) 3A is provided in an inner circumferential wall portion in a lower end portion of the cylindrical main body. As shown in FIG. 11B, the stick-shaped member 3A is provided substantially horizontally so as to pass through the center of the axis of the cylindrical main body 2 and to be perpendicular to the center of the axis. When a bottle is inserted in the cylindrical main body 2, the stick-shaped member is in contact with the bottom face of the bottle, thus supporting the bottom face to keep the bottle in the cylindrical main body 2D. Both end portions of the stick-shaped member 3A are inserted into recessed portions formed in opposed positions on a lower portion of the cylindrical main body 2D, to be provided across the inside of the cylindrical main body in the center thereof. For the stick-shaped member 3A, a metal round stick is used as in the case of the stick-shaped supporting member 3.

Needless to say, the structures of the supporting members of the bottle cases 1C and 1D, in other words, the structure where the plurality of ribs 6 are provided on the inner circumferential surface of the cylindrical main body 2C of the bottle case 1C, the structure where the stick-shaped member 3A is included in the bottle case, and the like, may be applied to the lower end portions of the cylindrical main bodies 2A and 2B of the bottle cases 1A and 1B.

For example, on inner circumferential wall portions in a lower end portion of the cylindrical main body 2A including the flat face portion 22 on an outer circumferential portion thereof, a plurality of ribs 6 projecting toward the center of the axis may be provided. Alternatively, a plurality of ribs 6 projecting toward the center of the axis of the cylindrical main body 2B may be provided on inner circumferential portions in a lower end portion of the cylindrical main body 2B whose section is in a polygonal shape. In this case, it goes without saying that the ribs 6 are provided instead of the stick-shaped member 3.

Moreover, opposed recessed portions may be formed in the inner circumferential wall in a lower end portion of each of the cylindrical main bodies 2A and 2B, and both end portions of the stick-shaped member 3A may be inserted in the recessed portions such that the both end portions are not exposed to the outer circumferential portions in the lower end portion of each of the cylindrical main bodies 2A and 2B, thus permitting the stick-shaped member 3A to be across the hollow portion of each of the cylindrical main bodies. Furthermore, the stick-shaped members 3 and 3A are not limited to a metal round stick, and may be any member as long as the member can support the bottom face of a bottle inserted in to the cylindrical main bodies 2, and 2A to 2D. The stick-shaped member may be a stick-shaped member made of a mixed material produced by mixing wood waste material ground powder obtained from a wood waste material containing impurities and resin waste material ground powder obtained from a resin waste material containing impurities, as in the case of the cylindrical main bodies 2 and 2A to 2D.

Moreover, the supporting member such as the stick-shaped members 3 and 3A and the rib 3P may be structured in any way as long as the supporting member can support the bottom face of a bottle inserted in the cylindrical main body 2. Modifications of the supporting member are shown in FIGS. 16A to 16E and FIG. 17.

Supporting members shown in FIGS. 16A to 16E are provided in a lower end portion of each of the cylindrical main bodies 2, 2A, 2B, 2F, 2G, 2H, 2K and 2N, to water-tightly cover each lower end portion.

Figure 16A:
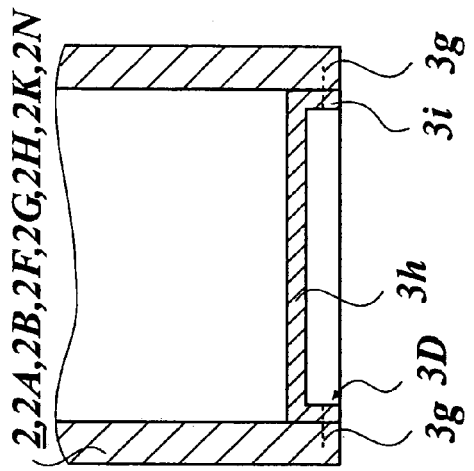
FIGS. 16A, 16B, 16C, 16D and 16E are schematic sectional views of a lower portion of the bottle case to which the present invention is applied, to show variations of a supporting member attached to the cylindrical main body.

A supporting member 3B shown in FIG. 16A includes: a disk 3a to cover the ring-shaped bottom face of the cylindrical main body 2 from the bottom thereof; and an attachment portion 3b to attach the disk to the cylindrical main body 2 by fitting the disk to an inner circumferential portion in a lower end portion of the cylindrical main body 2, the attachment portion being integrally provided on the top surface of the disk 3a.

The attachment portion 3b is ring-shaped, and has the same outer diameter as that of the cylindrical main body 2.

Figure 16B:
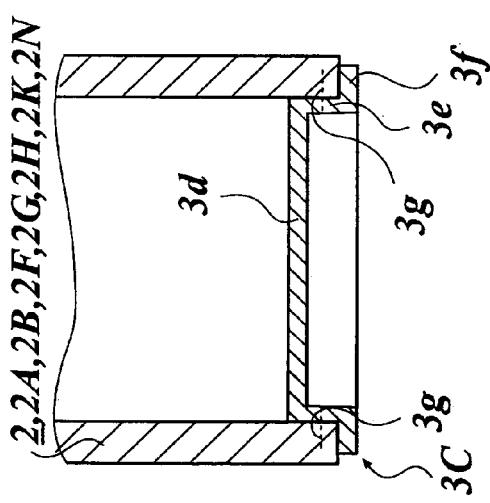

A supporting member 3C shown in FIG. 16B includes: a disk-shaped bottom plate 3d to cover a lower end portion of the cylindrical main body 2, the bottom plate 3d being disposed inside a cylindrical main body 2C and fitted therein with a predetermined space from the bottom end of the cylindrical main body 2C to an upper portion thereof; a ring-shaped portion 3e to be in contact with an inner circumferential wall in a lower end portion of the cylindrical main body 2, the ring-shaped portion 3e being provided to protrude downward along the periphery of the bottom plate 3d; and a ring-shaped contact plate 3f to be in contact with the bottom end surface of the cylindrical man body 2, the contact plate 3f horizontally protruding toward the outside from the ring-shaped portion 3e.

The supporting member 3C is fixed by coating adhesive agent to the outer edge of the bottom plate 3d to be in contact with the inner circumferential surface of the cylindrical main body 2 and to the outer circumferential surface of the ring-shaped portion 3e, fitting the bottom plate 3d from the bottom portion of the cylindrical main body 2, bringing the contact plate 3f into contact with the bottom end surface of the cylindrical main body 2, and putting staples 3g from the inner circumferential surface side to the outer circumferential surface side of the ring-shaped portion 3e. In this way, each bottom portion of the cylindrical main body 2 (2F, 2G, 2H, 2K, 2N) is formed to be a push-up bottom by the height of the ring-shaped portion 3e.

Figure 16C:
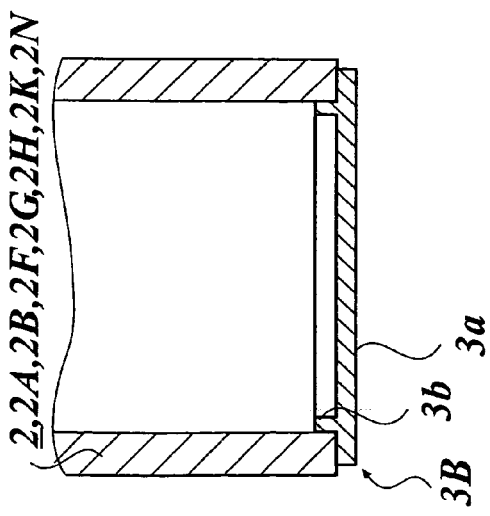

A supporting portion 3D shown in FIG. 16C has a C-shape section formed of a disk-shaped bottom plate 3h substantially horizontally fitted in the cylindrical main body 2 and a ring-shaped contact portion 3i which protrudes downward around the peripheral edge of the bottom plate 3h and in contact with the inner circumferential surface of a lower end portion of the cylindrical main body 2. The supporting portion 3 is fixed to the cylindrical main body 2 by putting staples 3g from the inner circumferential side of the contact portion 3i.

Figure 16D:
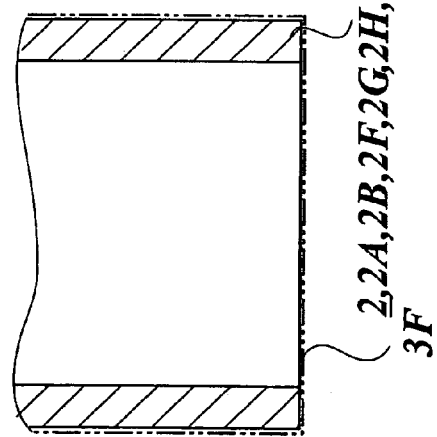

A supporting portion 3E shown in FIG. 16D is a plate member having substantially the same diameter as the diameter of the bottom portion of the cylindrical main body 2, and is welded on the cylindrical main body 2 in a state where the diameter thereof is fitted to the bottom end portion thereof. The supporting member 3E may be molded by melting and mixing the mixed material 112 and subjecting the mixed material to extrusion molding, injection molding or the like.

Figure 16E:
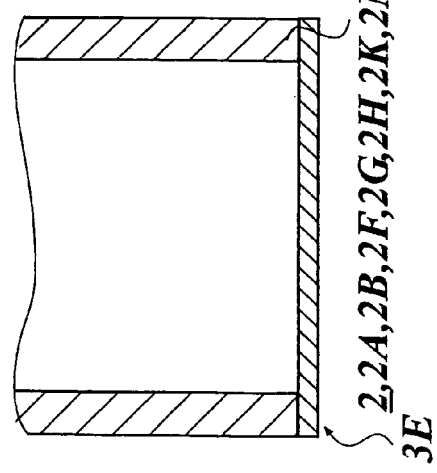

A supporting member 3F shown in FIG. 16E is a film to cover a lower end opening of the cylindrical main body 2, and covers the inner side of the cylindrical main body 2 (2F, 2G, 2H, 2K, 2N) by wrapping the bottom portion thereof from the bottom end thereof.

Each of the supporting members 3B to 3F are bottom portions to water-tightly cover the cylindrical main body 2, and to horizontally cover the inside of the cylindrical main body 2 (2A, 2B, 2F, 2G, 2H, 2K, 2N). The supporting member, however, may be any member as long as the member supports the bottom face of a bottle inserted in the cylindrical main body 2, and may be a member which has a sectional shape similar to the sectional shapes as shown in FIGS. 16A to 16E. For example, the supporting member may be a member which has a sectional shape similar to those shown in FIGS. 16A to 16E, and is as long as the length between the members separated to sandwich the hollow portion inside the cylindrical main body 2.

Figure 17:
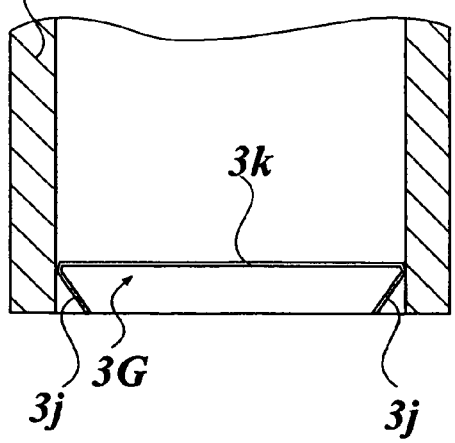
FIG. 17 is a schematic sectional view of a lower portion of the bottle case to which the present invention is applied, in which a spring member is used as a supporting member attached to the cylindrical main body.

For a supporting member to cover the cylindrical main body 2 (2A, 2B, 2F, 2G, 2H, 2K, 2N) not on the lower end thereof, a supporting plate 3G in a spring form as shown in FIG. 17 may be used.

The supporting plate 3G is, for example, a rectangular flat plate member made of stainless steel, and includes bent portions 3j formed by bending both end portions of the flat plate member, and a center portion 3k which is as long as the inner diameter of the cylindrical main body 2. The supporting plate 3G is attached by fitting the center portion 3k in the cylindrical main body 2 so as to pass the center of the axis thereof.

In other words, the supporting plate 3G is attached to the cylindrical main body 2 due to elastic deformation of the supporting plate itself. The supporting member 3D and the supporting plate 3G are applicable as a supporting member for a bottle case 1J.

In a bottle case including the supporting plate 3G in the cylindrical main body 2, 2A, 2B, 2F, 2G, 2H, 2J, 2K, 2N), the supporting plate 3G is attached to the cylindrical main body 2 (2A, 2B, 2F, 2G, 2H, 2J, 2K, 2N) by means of elastic deformation of the supporting plate 3G. Therefore, attachment thereof is easy, and a bottle is permitted to be inserted and kept inside the case. In this way, a bottle case with relaxing wood-like features is easily produced.

Figure 18A:
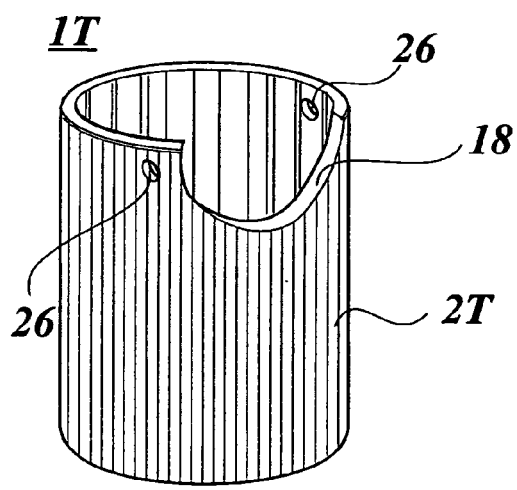
Figure 18B:
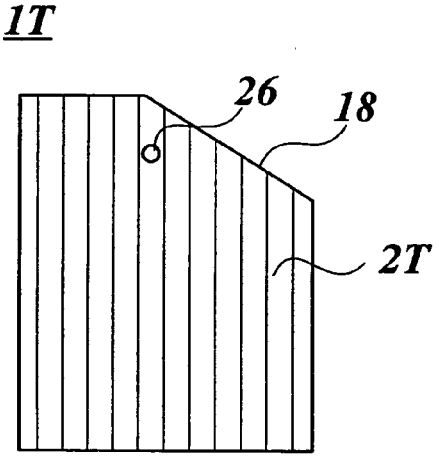
Figure 18C:
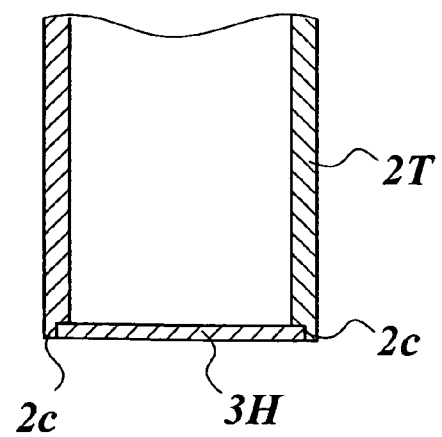

A second embodiment of a wood-like molded product according to the present invention is shown in FIGS. 18A to 18C.

The wood-like molded product shown in FIGS. 18A to 18C is a small article case to contain glasses, scissors and the like, which may be used as a pen holder to contain pens, brushes including a make-up brush, and the like. A small article case IT includes a cylindrical main body 2T prepared by modifying the above-described extrusion mold product 115 as the cylindrical main body 2. That is, the cylindrical main body 2T is made of the mixed material 112 prepared by mixing wood waste material ground powder obtained from a wood waste material containing impurities and resin waste material ground powder obtained from a resin waste material containing impurities. In the cylindrical main body 2T, there are formed a semicircular cut-out portion 18 on an upper end portion thereof, and small holes 26 communicating with the inner side of the cylindrical main body, at positions opposed to each other in an upper end portion.

In the bottom end of the cylindrical main body 1T, as shown in FIG. 18C, formed is a cut-out portion 2c of which the section is stepped along the inner circumference of the bottom edge of the cylindrical body. A bottom plate 3H is attached to fit in the cut-out portion 2c. The bottom plate 3H supports things inserted in a cylindrical main body 2T, for instance, scissors, glasses, writing utensils such as pens, and the like, while being in contact with the lower end portion (bottom portion) of the inserted articles. The bottom plate 3H may be made of any material. For example, the bottom plate 3H may be made of the mixed material 112. The small article case 1T may be used, for example, as a flower vase to contain dried flower or the like, or, a glass may be placed in the case, and a piece of string may be put through the holes 26, to use the case as a hanging flower vase. The dimensions of the small article case 1T are, for example, when viewed from a side thereof, the entire length of the cylindrical main body 2T is 105 mm, the outer diameter (length of the lower base) is 85 mm, the length of the upper base is 37 mm, the diameter of the small holes 26 is 5 Φ, the vertical length from the lower end of the cylindrical main body 2T to the lower end of the cut-out portion 18 is 74 mm. To use the case as a flower vase, the entire length is higher than the above by 45 mm.

Figure 19A:
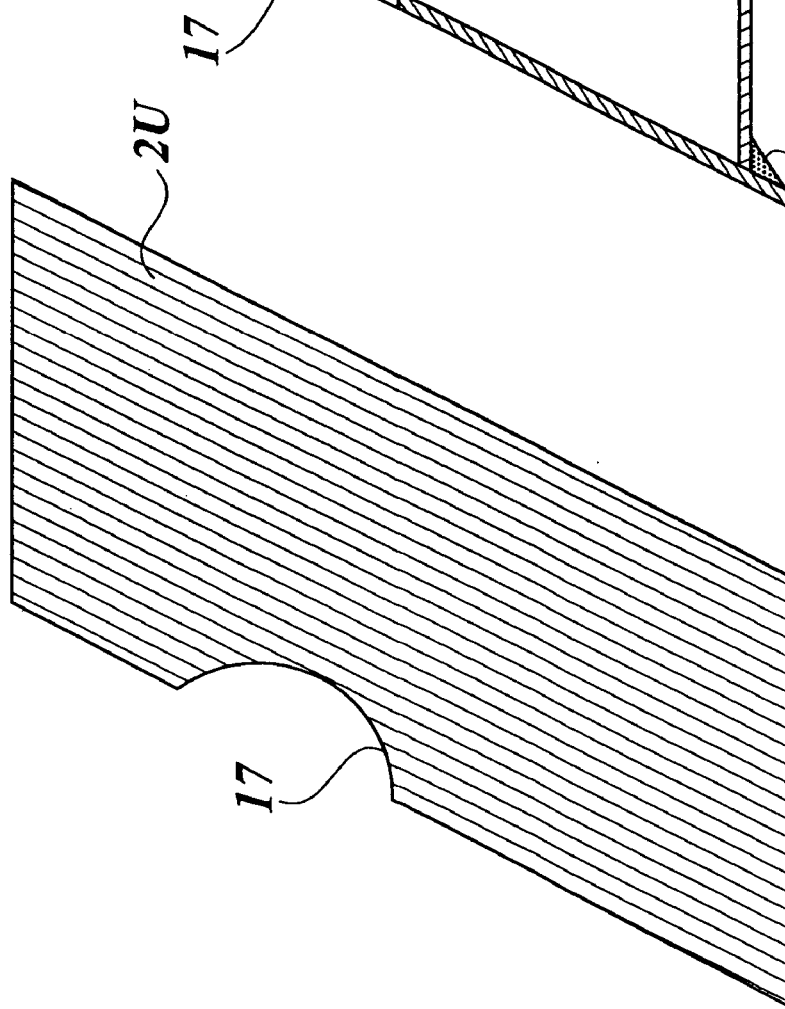
Figure 19B:
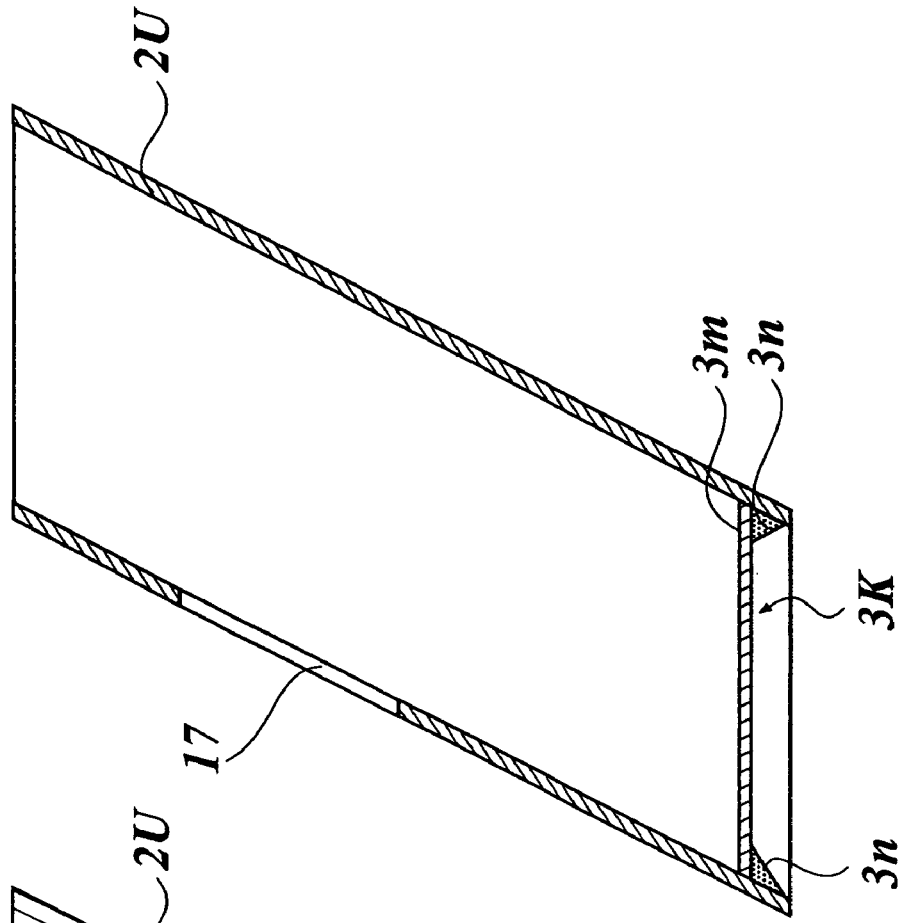

A third embodiment of a wood-like molded product according to the present invention is shown in FIGS. 19A and 19B.

The wood-like molded product shown in FIGS. 19A and 19B is used as a flower container 1U, and the flower container 1U includes a cylindrical main body 2U prepared by modifying the extrusion mold product 115 used for the cylindrical main body 2, and a bottom portion 3K to water-tightly cover the lower end portion of the cylindrical main body 2U.

The cylindrical main body 2U is formed into parallelogram when viewed from a side thereof, by obliquely cutting the tubular extrusion mold product 115 in parallel, with a predetermined space between the parallel cut portions, in a direction to intersect with but not perpendicular to the axis of the cylindrical main body 2U.

In a central portion on a side of the cylindrical main body 2U, a circular opening portion 17 communicating with the inside of the cylindrical main body is provided.

The bottom portion 3K includes: a disk-shaped bottom plate 3m which is disposed inside the cylindrical main body 2U at a lower end portion with a predetermined space up from the bottom thereof, and horizontally fitted in the cylindrical main body 2U; and a caulking member 3n attached along the bonded portion between the peripheral edge of the bottom plate 3m and the inner circumferential wall of the cylindrical main body 2U. The bottom portion 3K is in contact with the lower end or bottom face of such as a container containing dried flowers, fresh flowers or the like inside thereof, which is inserted in the cylindrical main body 2U, to support the lower end or bottom face thereof.

A fourth embodiment of a wood-like molded product according to the present invention is shown in FIGS. 20A and 20B.

A wood-like molded product 1V shown in FIGS. 20A and 20B is used as a flower container, and the flower container 1V includes a cylindrical main body 2V prepared by modifying the extrusion mold product 115 used for the cylindrical main body 2, and a bottom portion 3L to water-tightly cover the lower end portion of the cylindrical main body 2V.

As in the case of the above-described bottom portion 3K, the bottom portion 3K includes the bottom plate 3m and the caulking member 3n and the like, and therefore, a description of the operation thereof is omitted. By putting a piece of string through the hole 21 and tying the string into a ring shape, the flower container 1V is permitted to be hung at a high place on such as a wall through the ring-shaped spring.

Figure 21A:
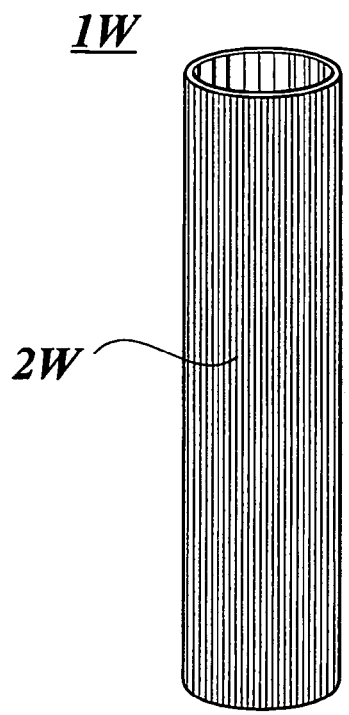
Figure 22A:
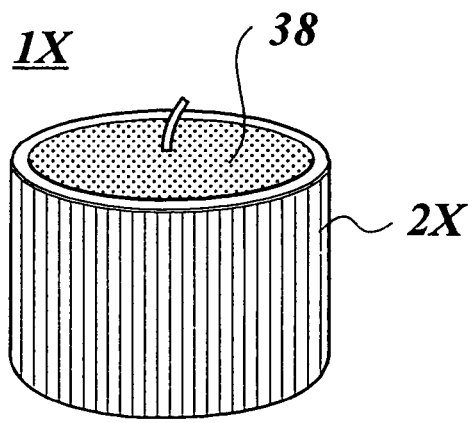
Figure 22B:
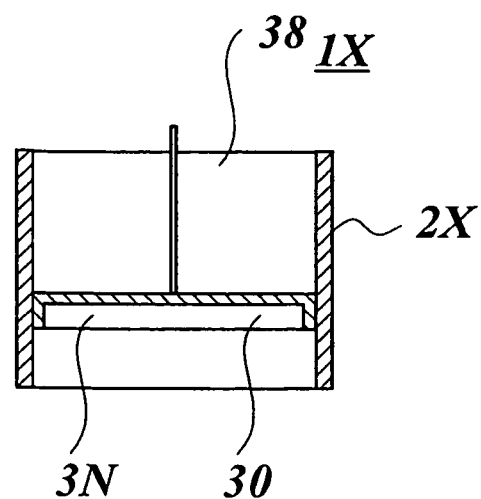

A fifth embodiment of a wood-like molded product according to the present invention is shown in FIGS. 21A and 22B, and a sixth embodiment of a wood-like molded product is shown in FIGS. 22A and 22B.

A wood-like molded products 1W and 1X shown in FIGS. 21A, 21B and FIGS. 22A, 22B, respectively, are used as a candle holder.

Figure 21B:
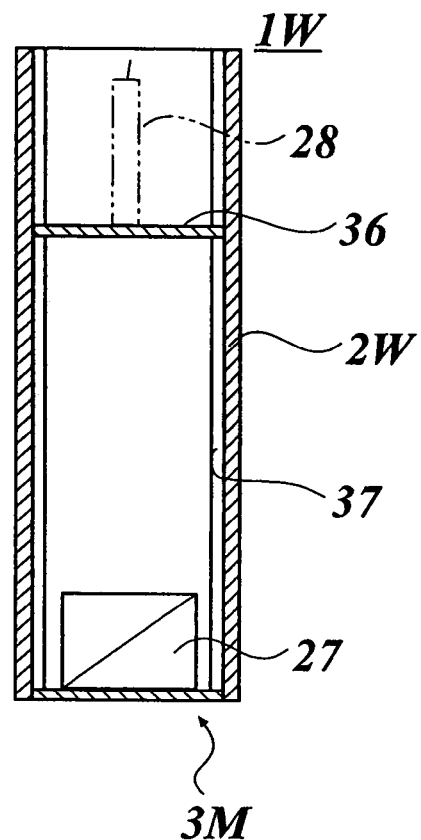

A candle holder 1W shown in FIGS. 21A and 21B includes: a cylindrical main body 2W whose top and bottom faces are perpendicular to the axial direction thereof, which is prepared by cutting the extrusion mold product 115 into a predetermined length; a bottom plate 3M (refer to FIG. 21B) attached to the inner circumferential wall at a lower end portion of the cylindrical main body 2W; a weight 27 provided on the bottom plate inside the cylindrical main body 2W; a contact plate 36 to be in contact with and support the bottom face of a candle 28 inserted from an opening in an upper portion of the cylindrical main body 2W, the contact plate 36 being horizontally disposed on the inner circumferential wall in an upper side of the cylindrical main body 2W; and a support member 37 to support the contact plate 36 inside the cylindrical main body 2W, the support member 37 being provided along the inner wall of the cylindrical main body 2W.

A candle holder 1X shown in FIGS. 22A and 22B includes: a cylindrical main body 2W whose top and bottom faces are perpendicular to the axial direction thereof, which is prepared by cutting the extrusion mold product 115 into a predetermined length; and a support plate 3N horizontally disposed in the cylindrical main body 2W to cover inside thereof, and to be in contact with and support the bottom face of a candle 38 inserted from above the cylindrical main body (here, melted wax is poured and solidified therein). The support plate 3N has a C-shape section including, in a central portion of the bottom face of the support plate 3N, a recessed portion 3o which is open lower end, and thus the bottom of the support plate is a push-up bottom. For example, the dimensions of the candle holder 1X are, the diameter of the cylindrical main body 2X is 85 Φ, the height is 60 mm, and the length from the support plate 3N to the top end of the cylindrical main body 2N is 35 mm, and the like.

The above-described small article case 1T, flower containers 1U and 1V, and candle holders 1W and 1X of the second to sixth embodiments have substantially the same operations as that of the first embodiment.

That is, each is produced by utilizing the wood waste material J and the resin waste material K, and, since there is no need to cut down natural trees, each has advantages in view of effective use of resources and environmental protection. Moreover, it is possible to contain and keep pens, make-up brushes and the like as a pen (brush) holder, or objects such as glasses, scissors, glasses, dried flowers, fresh flowers, and the candles 28 and 38, in the case having features such as a feel similar to natural wood, that is, relaxing wood-like features.

Moreover, the wood portion N in the wood waste material J makes up 51 to 75 wt % with respect to each of the cylindrical main bodies 2T, 2U, 2V, 2W and 2X, the resin portion P in the resin waste material K makes up 10 to 45 wt % with respect to each of the cylindrical main bodies 2T, 2U, 2V, 2W and 2X, and the impurities L makes up 20 wt % or less in total with respect to each of the cylindrical main bodies 2T, 2U, 2V, 2W and 2X. Since the wood flour N in the wood waste material J makes up 51 to 75 wt % with respect to the cylindrical main bodies 2T, 2U, 2V, 2W and 2X, the cylindrical main bodies are permitted to have features such as a feel similar to real wood. Moreover, the amount of the wood portion used as a component of the mixed material is large, and thus the percentage of re-use of the wood waste material J can be increased.

Further, the resin portion in the resin waste material ground powder K, namely, the resin powder P, makes up 10 to 45 wt % with respect to the cylindrical main bodies 2T, 2U, 2V, 2W and 2X. Therefore, enough strength and rigidity are obtained from a mold product, and thus moldability upon extrusion molding or the like can be improved. Furthermore, since the impurities make up 20 wt % or less in total with respect to each of the cylindrical main bodies 2T, 2U, 2V, 2W and 2X, moldability upon forming the cylindrical main body 2 by extrusion molding is good. Moreover, since relatively large amount of impurities L are contained, it is advantageous in view of effective use of resources and environmental protection.

With respect to the small article case 1T, the flower containers 1U and 1V, and the candle holders 1W and 1X, the cylindrical main bodies 2T, 2U, 2V, 2W and 2X are produced by: heating and melting the mixed material 112 and subjecting the mixed material 112 to extrusion molding with the extrusion molding device 30 to form the cylindrical extrusion mold product 115; permitting the extrusion mold product 115 to be inserted to the opening portion 41 of the sizer member 40 whose inner diameter is substantially the same as the outer diameter of the extrusion mold product 115, to adjust the sectional shape and the dimensions of the extrusion mold product 115; and then cutting the extrusion mold product 115 with the cutting device 117 into a predetermined length. Thus, it is possible to permit each of the cylindrical main bodies 2T, 2U, 2V, 2W and 2X to have wood-like features while there are advantages in view of re-use of resources, and to have a suitable shape and dimensions.

The extrusion mold product 115 to be the cylindrical main body 2 may be used in the following manner. The operation thereof is similar to that obtained from the cylindrical main body 2.

Figure 23B:
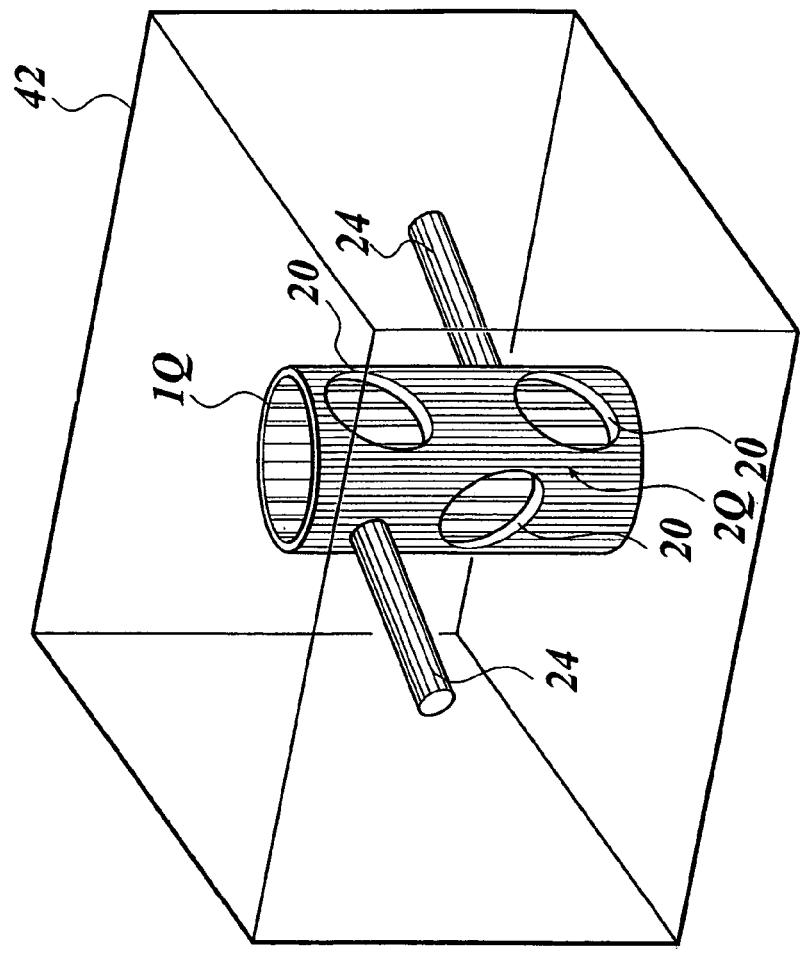
Figure 23A:
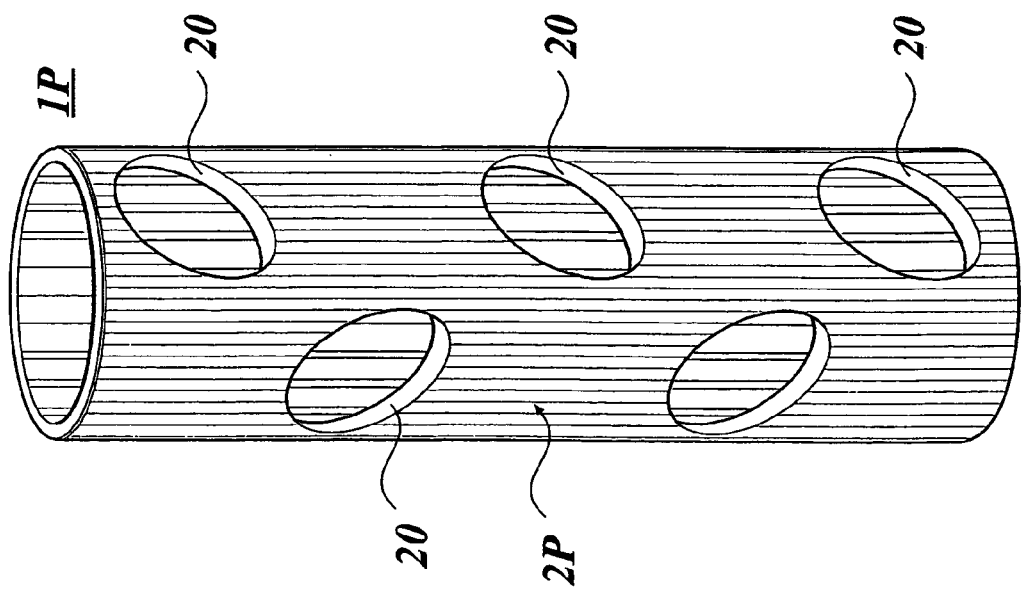

A pseudo tree 1P shown in FIG. 23A is prepared by forming a plurality of opening portions 20 communicating with the inside of a cylindrical main body 2P which is molded in a similar way to that of the cylindrical main body 2 prepared by using the extrusion mold product 115.

The pseudo tree 1P is produced by: heating and melting the mixed material 112 and subjecting the mixed material 112 to extrusion molding with the extrusion molding device 30 to form the cylindrical extrusion mold product 115; permitting the extrusion mold product 115 to be inserted to the opening portion 41 of the sizer member 40 whose inner diameter is substantially the same as the outer diameter of the extrusion mold product 115, to adjust the sectional shape and the dimensions of the extrusion mold product 115; and then cutting the extrusion mold product 115 with the cutting device 117 into a predetermined length. Then, the opening portions 20 are formed at predetermined positions using a piercing device (not shown).

The pseudo tree 1P thus produced may be placed in a water tank or the like, thus serving as an ornament as a floating wood in the water tank.

A pseudo tree 1Q shown in FIG. 23B is a modification of the pseudo tree 1P in FIG. 23A. The pseudo tree 1Q is produced by: cutting the cylindrical main body 2P of the pseudo tree 1P to make the length in the axial direction shorter; preparing a cylindrical main body 2G including the opening portions 20; and attaching stick members 24 made of the mixed material 112. More specifically, the pseudo tree 1Q has a form of a trunk of a short length including branches. In FIG. 23B, the pseudo tree 1Q is placed in a cage 42 where insects or the like are raised. The pseudo tree 1Q including the cylindrical main body 2Q with the stick members 24 may be placed in a birdcage to be used as a roost.

FIG. 24A shows a socket cover 1R of an electric bulb, which is produced by cutting the extrusion mold product 115 to be the cylindrical main body 2 into a short length, and one of opening edges thereof is modified to fit to the spherical surface of an electric bulb 39.

A fluorescent light cover IS of a straight-pipe type shown in FIG. 24B includes a cylindrical main body 2S which is the extrusion mold product 115 to be the cylindrical main body 2; and a long opening portion 19 formed in a central portion to be extended along the axial direction of the cylindrical main body 2S. A fluorescent light of a strip-light type is disposed in the cylindrical main body 2S along the axial direction thereof, and the light of the fluorescent light in the cylindrical main body 2S emits toward the outside thereof through the long opening portion 19. Although not illustrated, at both ends of the cylindrical main body 2S, supporting members to support both ends of the fluorescent light of a strip-light type disposed in the cylindrical main body 2S. Both ends of the fluorescent light cover 1S may be formed in any shape, and may be formed, for example, into a shape of a bamboo spear by obliquely cutting both ends of the cylindrical main body 2S.

FIG. 25 shows a belt-like member 1Y which includes a plurality of cylindrical main bodies 2Y produced by modifying the extrusion mold product 115 to be the cylindrical main body 2, and the plurality of cylindrical main bodies 2Y are aligned in a direction perpendicular to the axial direction thereof, to be connected by flexible connecting members 43.

Each of the connecting members 43 is a long linear member such as a rope, and is put through through-holes 21d, which are formed on both sides of each of the cylindrical main bodies 2Y so as to pass through the inside of the cylindrical main body 2Y in a direction perpendicular to the axial direction thereof, to connect the cylindrical main bodies 2Y. On one end in the longitudinal direction of the belt-like member 1Y, a hook member 44 is provided.

One end of the belt-like member 1Y is hooked through the hook member 44 to an upper end portion of a supporting member having a length shorter than the entire length of the belt-like member 1Y. The belt-like member 1Y is then placed so as to curve toward the other end thereof, and thus is used as a back board and a seat board of a chair.

Figure 26A:
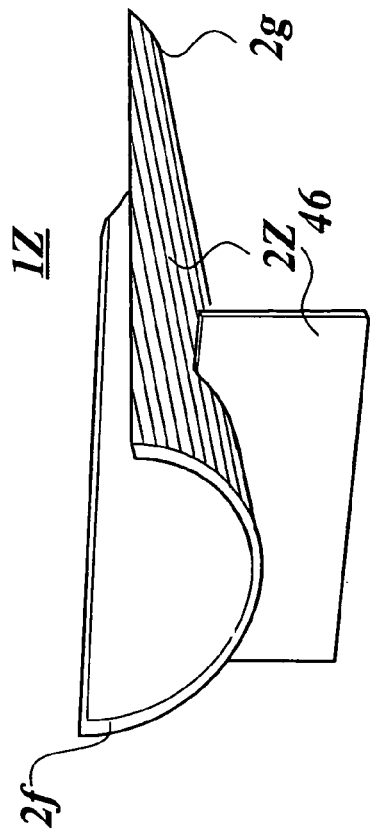
Figure 26C:
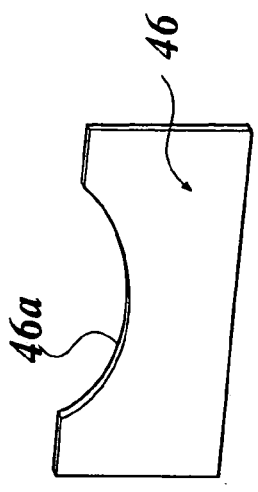

Using the extrusion mold product 115 to be the cylindrical main body 2, a bottle holder 1Z shown in FIG. 26A may be prepared.

The bottle holder 1Z includes: a circular arc plate member 2Z whose section is circular arc shape, which is prepared by modifying the extrusion mold product 115 to be the cylindrical main body 2; and a supporting plate member 46 attached to the lower side of an end portion 2f of the circular arc plate member 2Z, to allow the circular arc plate member 2Z to be inclined from the end portion 2f to the other end portion 2g side.

The circular arc plate member 2Z is prepared by obliquely cutting (the cutting line is denoted by reference numeral 202d) to divide a cylindrical body 202, which is molded in a similar way to that of the cylindrical main body 2 in a cylindrical shape, into two pieces. In the circular arc plate member 2Z as a divided piece, when the obliquely cut portion is assumed to be the upper side, with respect to the circular arc end portions 2f and 2g on the right and left sides thereof, the end portion 2f is longer than the other end portion 2g. Moreover, a slit 2h extending in the circumferential direction is formed in the outer circumferential wall on the side of the end portion, and the circular arc plate member 2Z is supported on the supporting plate member 46 through the slit 2h.

Figure 26B:
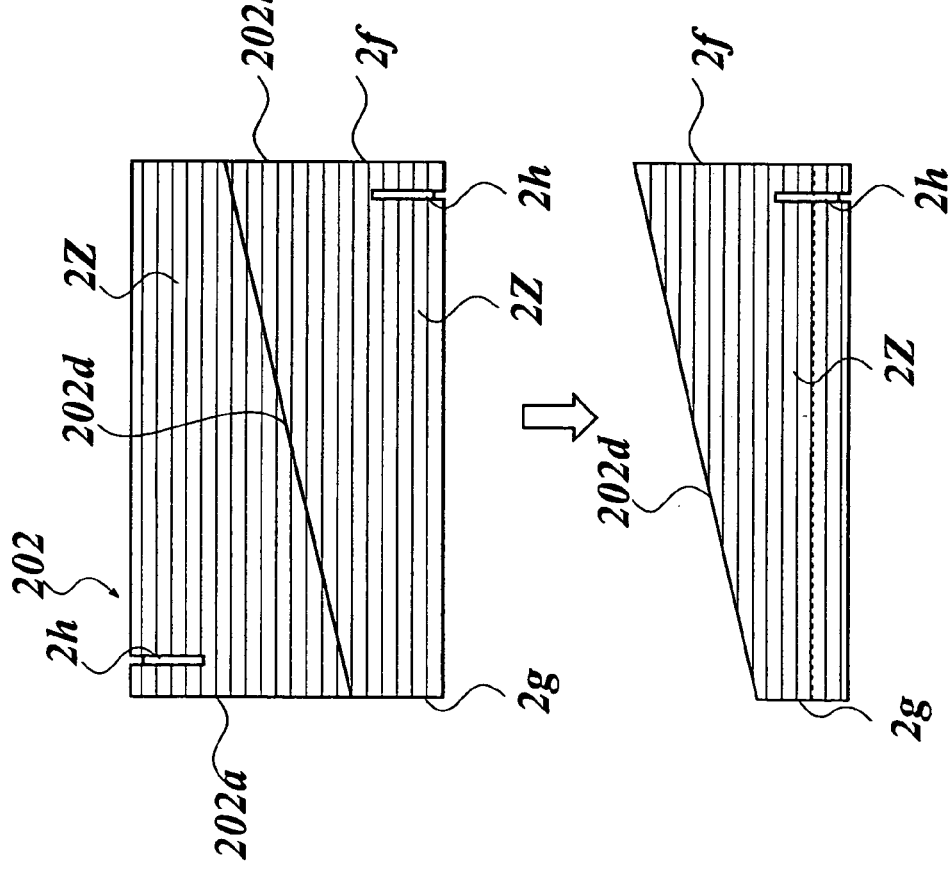

FIG. 26B shows the supporting plate member 46. The supporting plate member 46 is molded by using the mixed material 112 and has wood-like features. The supporting plate member 46 has a rectangular shape, and includes a circular arc cut-out portion 46a on the upper side thereof.

While the supporting plate member 46 is stood, the cut-out portion 46a is engaged with the slit 2h of the circular arc plate member 2Z from the outside. Thus, the supporting plate member 46 is installed into the circular arc plate member 2Z so as to intersect with the axial direction of the circular arc plate member 2Z.

Figure 27B:
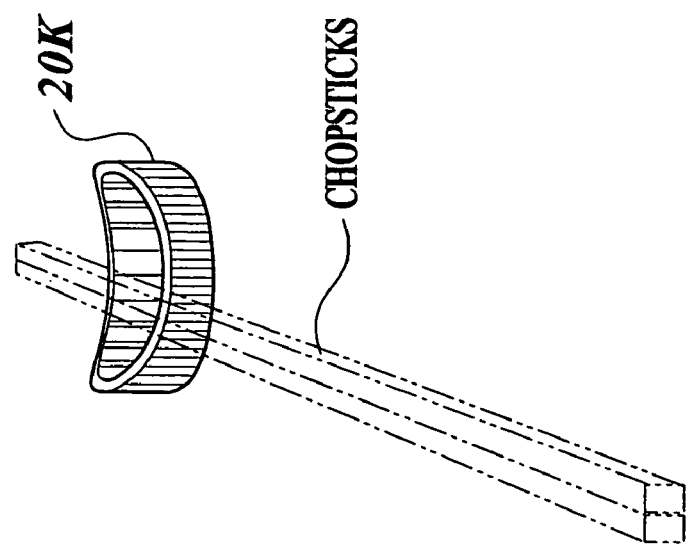
Figure 27A:
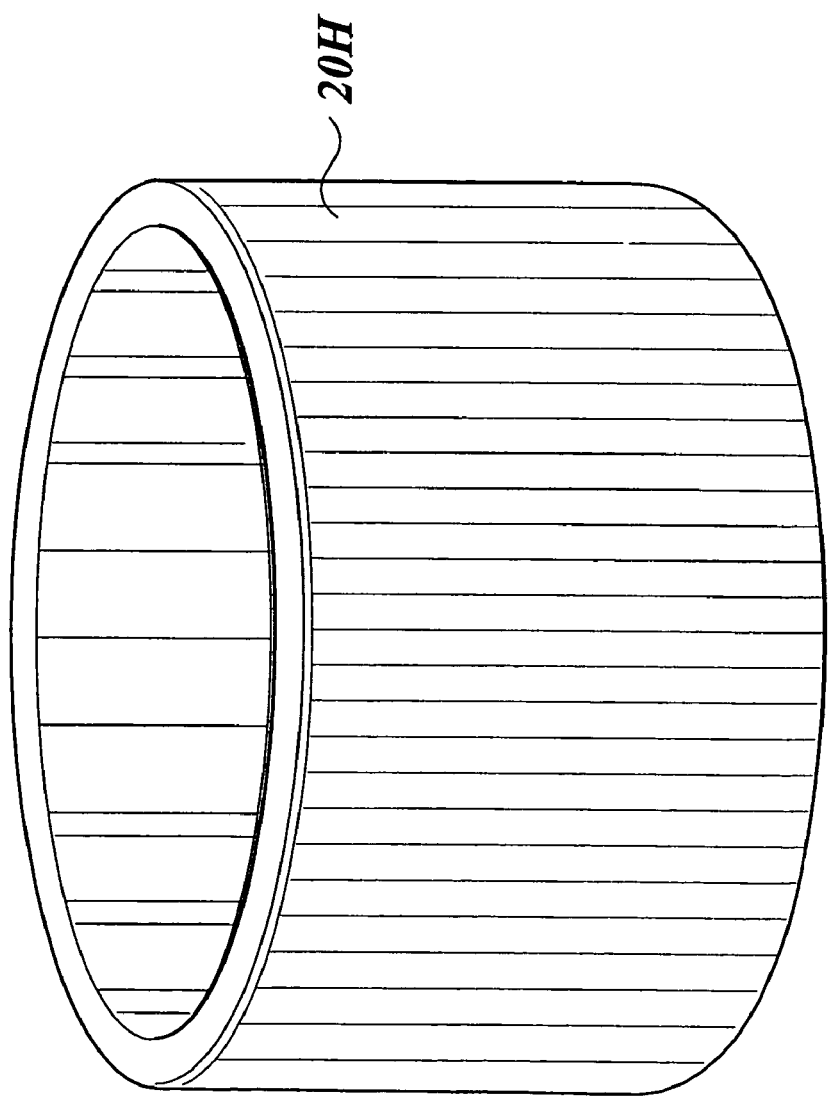

FIGS. 27A and 27B show products which are molded using a manufacturing apparatus including the extrusion molding device 30, sizer member 40, crushing device 102, eddy current separator device 103, powerful magnet 103, gravity separator device 103, crushing device 104, grinding device 106, blending mixer 108, inorganic pigment feeding portion 109, crushing device 116, cutting device 117, coating device, and the like.

FIG. 27A is a large pipe manufactured by the manufacturing apparatus, which includes a cylindrical main body 20H with an outer diameter of 450 Φ and a height of 450 mm. In this structure, the outer diameter may be 300 Φ. The cylindrical main body 20H may be used as a cover for a china pot or the like, to permit the pot to have a wood-like appearance when placed on the outer side of the pot. FIG. 27B shows a chopstick rest 20K prepared by cutting the upper side of a short cylindrical main body in a circular arc shape.

The cylindrical main bodies 2P, 2G, 20H, socket cover 1R, fluorescent light cover 1S, cylindrical main body 2Y of the belt-like member 1Y, circular arc plate 2Z of the bottle holder 1Z, and chopstick rest 20K has wood-like features which shows a relaxing feature. In order to allow the cylindrical main bodies 2P, 2G, 20H, socket cover 1R, fluorescent light cover 1S, cylindrical main body 2Y of the belt-like member 1Y, circular arc plate 2Z of the bottle holder 1Z, and chopstick rest 20K to have wood-like features, it may be thought to produce wooden products. However, depletion of natural resources due to cutting large quantity of trees and the like has been raised as a problem in recent years, and it may become difficult to supply wood materials stably. Therefore, it is desirable to use wood materials as little as possible, and to manufacture the bottle cases from a material other than wood materials.

Accordingly, by manufacturing the cylindrical main bodies 2P, 2G, 20H, socket cover IR, fluorescent light cover IS, cylindrical main body 2Y of the belt-like member 1Y, circular arc plate 2Z of the bottle holder 1Z, and chopstick rest 20K in a similar way to that of the cylindrical main body 2 by using the above-mentioned manufacturing apparatus, there is no need to cut natural trees. Moreover, since waste materials are used, it is advantageous in view of effective use of resources. Furthermore, the above products have features such as a feel similar to natural wood, in other words, a relaxing wood-like features, and have preferable molding dimensions, thus having an operation similar to those of the above embodiments.

The wood-like molded product according to the first aspect of the present invention includes: the cylindrical main body made of a mixed material containing fine cellulose powder particles, which are obtained from wood materials, and resin; and the supporting member to support the bottom face of a bottle inserted in the cylindrical main body. Therefore, when chips or sawdust of a building wood material generated at a construction site are used for the wood material for the bottle case, it is possible to avoid cutting natural trees and re-use the resources, as well as to permit the bottle case to have features such as a feel similar to natural wood, and keep a bottle such as a wine bottle inserted in the case having relaxing wood-like features. Moreover, since a wine bottle is inserted and kept in the cylindrical main body having wood-like features, the wine kept in the cylindrical main body looks like a more expensive wine than the actual price, due to the wood-like appearance of the cylindrical main body.

The wood-like molded product according to the second aspect of the present invention is made of a mixed material prepared by mixing wood waste material ground powder obtained from a wood waste material containing impurities and resin waste material ground powder obtained from a resin waste material containing impurities. The wood-like molded product includes a cylindrical main body capable of containing a bottle therein, and a supporting member provided inside the cylindrical main body. Therefore, the product is advantageous in view of effective use of resources and environmental protection, since there is no need to cut natural trees through use of the wood waste material and resin waste material. Moreover, a bottle such as a wine bottle is inserted and kept in the cylindrical main body which has relaxing wood-like features such as a feel similar to natural wood.

In the wood-like molded product according to the second aspect of the invention, when an opening portion which communicates with the inner side of the cylindrical main body and through which the bottle inserted therein is visually recognizable is formed, an operation similar to that of the second aspect of the invention can be obtained. Moreover, when a bottle such as a wine bottle is contained in the cylindrical main body, it is advantageous in view of effective use of resources and environmental protection since there is no need to cut natural trees. Moreover, it is possible to keep the bottle in the cylindrical main body which has features such as a feel similar to natural wood, in other words, relaxing wood-like features. Further, through the opening portion, it is possible to visually recognize the bottle kept inside the cylindrical main body without taking the bottle out from the cylindrical main body.

The wood-like molded product according to the third embodiment of the present invention is advantageous in view of effective use of resources and environmental protection, since the wood waste material and the resin waste material are used, without cutting natural trees. Moreover, it is possible to contain and keep objects such as a wine bottle in the wood-like molded product having features such as a feel similar to natural wood, in other words, relaxing wood-like features.

In the wood-like molded products according to the second and third aspects of the invention, when wood flour in the wood waste material makes up 51 to 75 wt % with respect to the entire cylindrical main body, the resin portion in the resin waste material makes up 10 to 45 wt % with respect to the cylindrical main body, and the impurities make up 20 wt % or less in total with respect to the entire cylindrical main body, an operation similar to those of the second and third aspects of the invention can be obtained. Moreover, wood flour in the wood waste material makes up 51 to 75 wt % with respect to the entire cylindrical main body, and therefore, the cylindrical main body is permitted to have features such as a feel similar to real wood. Further, the amount of the wood portion used as a component of the mixed material is large, and thus the percentage of re-use of the wood waste material can be increased. Furthermore, since the resin portion in the resin waste material, that is, resin powder, makes up 10 to 45 wt % with respect to the cylindrical main body, enough strength and rigidity are obtained from a mold product, and thus moldability upon extrusion molding or the like can be improved. In addition, since the impurities make up 20 wt % or less in total with respect to the cylindrical main body, moldability upon forming the cylindrical main body by extrusion molding is good. Moreover, since relatively large amount of impurities are contained, it is advantageous in view of effective use of resources and environmental protection. Further, since the cylindrical main body includes favorable wood-like features, the product value is increased, and accordingly, an article such as a bottle contained in the cylindrical main body is permitted to look more expensive than the actual value.

According to the manufacturing apparatus according to the fourth aspect of the invention, the cylindrical main body is produced by: heating and melting the mixed material and subjecting the mixed material to extrusion molding with the extrusion molding device to form the cylindrical extrusion mold product; inserting the extrusion mold product into the opening portion of the sizer member, of which the inner diameter is substantially the same as the outer diameter of the extrusion mold product, to adjust the sectional shape and the dimensions of the extrusion mold product; and then cutting the extrusion mold product with the cutting device into a predetermined length. In this way, it is possible to permit the cylindrical main body according to the first to third aspects of the invention to have wood-like features while there are advantages in view of re-use of resources, and to have a suitable shape and dimensions. Thus, the product value is increased.

According to the manufacturing method according to the fifth aspect of the invention, the cylindrical main body is produced by: heating and melting the mixed material and subjecting the mixed material to extrusion molding to form the mixed material into a cylindrical shape, in the extrusion molding step; adjusting the sectional shape and the dimensions of the extrusion mold product formed by the extrusion molding, in the sizer step; and cutting the extrusion mold product, of which sectional shape and dimensions are adjusted, into a predetermined length, in the cutting step. In this way, it is possible to permit the cylindrical main body of the wood-like molded product according to any one of claims 1 to 5 to have wood-like features while there are advantages in view of re-use of resources, and to have a suitable shape and dimensions.

INDUSTRIAL APPLICABILITY

As described above, the wood-like molded product according to the present invention is suitably used as a bottle case and the like, into which a bottle such as a wine bottle is inserted.

The invention claimed is:

1. A wood-like molded product comprising:
a cylindrical main body which is made of a mixed material prepared by mixing wood waste material ground powder obtained from a wood waste material containing an impurity, resin waste material ground powder obtained from a resin waste material containing an impurity, and a pigment, and permits a bottle to be inserted thereinto, the cylindrical main body contains a wood portion in the wood waste material, of 51 to 75 wt % with respect to the whole of the cylindrical main body, a resin portion in the resin waste material, of 10 to 45 wt % with respect to the whole of the cylindrical main body, and the impurities of 20 wt % or less in total with respect to the whole of the cylindrical main body; and
a supporting member provided in the cylindrical main body, to support a bottom face of the bottle inserted in the cylindrical main body, wherein
a particle size of wood flour particles in the wood portion is set to 1 to 300 µm, the wood flour particles are uniformly dispersed in the cylindrical main body, and a resin is filled between the wood flour particles,
the pigment forms a wood grain pattern on a surface of the cylindrical main body, and
the cylindrical main body has an opened top end and an opened bottom end, a uniform outer diameter over an entire length thereof, and a sanded surface having a pattern with a plurality of streaks.

2. The wood-like molded product as claimed in claim 1, wherein an opening portion which communicates with the inside of the cylindrical main body and through which the bottle is visually recognizable, the bottle being inserted in the cylindrical main body, is formed.

3. A wood-like molded product comprising:
a cylindrical main body which is made of a mixed material prepared by mixing wood waste material ground powder obtained from a wood waste material containing an impurity, resin waste material ground powder obtained from a resin waste material containing an impurity, and a pigment, and permits an article to be inserted thereinto, the cylindrical main body contains a wood portion in the wood waste material, of 51 to 75 wt % with respect to the whole of the cylindrical main body, a resin portion in the resin waste material, of 10 to 45 wt % with respect to the whole of the cylindrical main body, and the impurities of 20 wt % or less in total with respect to the whole of the cylindrical main body; and
a supporting member provided to the cylindrical main body, to support a bottom face of the article inserted in the cylindrical main body, wherein
a particle size of wood flour particles in the wood portion is set to 1 to 300 µm, the wood flour particles are uniformly dispersed in the cylindrical main body, and a resin is filled between the wood flour particles,
the pigment forms a wood grain pattern on a surface of the cylindrical main body, and
the cylindrical main body has an opened top end and an opened bottom end, a uniform outer diameter over an entire length thereof, and a sanded surface having a pattern with a plurality of streaks.

4. A manufacturing method of manufacturing a wood-like molded product that includes
a cylindrical main body which is made of a mixed material prepared by mixing wood waste material ground powder obtained from a wood waste material containing an impurity, resin waste material ground powder obtained from a resin waste material containing an impurity, and a pigment, and permits a bottle to be inserted thereinto, the cylindrical main body contains a wood portion in the wood waste material, of 51 to 75 wt % with respect to the whole of the cylindrical main body, a resin portion in the resin waste material, of 10 to 45 wt % with respect to the whole of the cylindrical main body, and the impurities of 20 wt % or less in total with respect to the whole of the cylindrical main body, and
a supporting member provided in the cylindrical main body, to support a bottom face of the bottle inserted in the cylindrical main body, a particle size of wood flour particles in the wood portion being set to 1 to 300 µm, the wood flour particles being uniformly dispersed in the cylindrical main body, and a resin being filled between the wood flour particles, the pigment forming a wood grain pattern on a surface of the cylindrical main body, and the cylindrical main body having an opened top end and an opened bottom end, a uniform outer diameter over an entire length thereof, and a sanded surface having a pattern with a plurality of streaks, the manufacturing method comprising:
an extrusion molding step of heating and melting the mixed material, and molding the mixed material into a cylindrical shape, having the opened top end and the opened bottom end and the supporting member, through extrusion molding;
a sizer step of adjusting a sectional shape and a dimension of an extrusion mold product, molded through the extrusion molding in the extrusion molding step, by inserting the extrusion mold product into an opening of a sizer member;
a sanding step of sanding the surface of the extrusion mold product to form the plurality of streaks thereon; and
a cutting step of cutting the extrusion mold product, of which the sectional shape and the dimension are adjusted in the sizer step, into a predetermined length, thus forming the cylindrical main body.

5. The wood-like molded product as claimed in claim 1, wherein a concentration of the resin portion is 10 to 30 wt %.

6. The wood-like molded product as claimed in claim 3, wherein a concentration of the resin portion is 10 to 30 wt %.

7. The wood-like molded product as claimed in claim 1, wherein
the pigment includes inorganic pigments of three colors of yellow, red, and black, and
the inorganic pigments are selectively used.

8. The wood-like molded product as claimed in claim 3, wherein
the pigment includes inorganic pigments of three colors of yellow, red, and black, and
the inorganic pigments are selectively used.

9. The wood-like molded product as claimed in claim 1, wherein
the supporting member is a stick-shaped member located in proximity to the opened bottom end of the cylindrical main body, and
the supporting member extends along a diameter of the cylindrical main body.

10. The wood-like molded product as claimed in claim 3, wherein
the supporting member is a stick-shaped member located in proximity to the opened bottom end of the cylindrical main body, and
the supporting member extends along a diameter of the cylindrical main body.

11. The wood-like molded product as claimed in claim 1, wherein
the supporting member includes a plurality of projected portions located in proximity to the opened bottom end of the cylindrical main body.

12. The wood-like molded product as claimed in claim 3, wherein
the supporting member includes a plurality of projected portions located in proximity to the opened bottom end of the cylindrical main body.

* * * * *